United States Patent
Mun et al.

(10) Patent No.: US 9,712,292 B2
(45) Date of Patent: Jul. 18, 2017

(54) APPARATUS FOR TRANSMITTING BROADCAST SIGNAL, APPARATUS FOR RECEIVING BROADCAST SIGNAL, METHOD FOR TRANSMITTING BROADCAST SIGNAL, AND METHOD FOR RECEIVING BROADCAST SIGNAL

(71) Applicant: LG ELECTRONICS INC., Seoul (KR)

(72) Inventors: Chulkyu Mun, Seoul (KR); Byounggill Kim, Seoul (KR); Woochan Kim, Seoul (KR); Jaehyung Kim, Seoul (KR); Sungryong Hong, Seoul (KR); Jinyong Choi, Seoul (KR); Jaeho Hwang, Seoul (KR); Jongseob Baek, Seoul (KR); Kookyeon Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/894,881

(22) PCT Filed: May 28, 2014

(86) PCT No.: PCT/KR2014/004762
§ 371 (c)(1),
(2) Date: Nov. 30, 2015

(87) PCT Pub. No.: WO2014/193160
PCT Pub. Date: Dec. 4, 2014

(65) Prior Publication Data
US 2016/0119092 A1    Apr. 28, 2016

Related U.S. Application Data

(60) Provisional application No. 61/827,755, filed on May 28, 2013, provisional application No. 61/837,129, (Continued)

(51) Int. Cl.
*H04H 20/00* (2009.01)
*H04L 5/00* (2006.01)
(Continued)

(52) U.S. Cl.
CPC ......... *H04L 5/0007* (2013.01); *H04B 7/0413* (2013.01); *H04H 20/00* (2013.01); (Continued)

(58) Field of Classification Search
CPC ... H04L 1/0041; H04L 1/0071; H04L 5/0048; H04L 5/005; H04L 5/0007; H04L 65/607; (Continued)

(56) References Cited

U.S. PATENT DOCUMENTS 6,175,550 B1   1/2001  van Nee
2007/0206698 A1*  9/2007  Yu .................. H04L 5/0023
                                                    375/267
(Continued)

FOREIGN PATENT DOCUMENTS

EP   2 346 224 A1   7/2011
EP   2 541 907 A2   1/2013
(Continued)

*Primary Examiner* — Vineeta Panwalkar
(74) *Attorney, Agent, or Firm* — Birch, Stewart, Kolasch & Birch, LLP

(57) ABSTRACT

An apparatus for transmitting a broadcast signal according to one embodiment of the present invention comprises: an encoder for encoding data pipe (DP) data corresponding to a DP which transmits at least one broadcast service or broadcast service component; a mapper for mapping the encoded DP data on a constellation; a time interleaver for (Continued)

time-interleaving the mapped DP data; a frame builder for generating at least one signal frame builder for generating at least one signal frame including the time-interleaved DP data; a pilot inserting unit for inserting signal frame, according to at least one pilot pattern; an OFDM modulator for OFDM-modulating the at least one generated signal frame using OFDM parameters; and a transmitter for transmitting at least one broadcast signal including the at least one modulated signal frame.

12 Claims, 32 Drawing Sheets

Related U.S. Application Data filed on Jun. 19, 2013, provisional application No. 61/847,535, filed on Jul. 17, 2013.

(51) Int. Cl.

| | | |
|---|---|---|
| *H04L 1/00* | (2006.01) | |
| *H04H 20/72* | (2008.01) | |
| *H04B 7/0413* | (2017.01) | |
| *H04L 29/06* | (2006.01) | |
| *H04H 60/73* | (2008.01) | |

(52) U.S. Cl.
CPC .............. *H04H 20/72* (2013.01); *H04L 1/00* (2013.01); *H04L 5/0048* (2013.01); *H04L 65/607* (2013.01); *H04H 60/73* (2013.01)

(58) Field of Classification Search
CPC ....... H04L 1/00; H04B 7/0413; H04B 7/0456; H04H 20/72; H04H 20/00; H04H 60/73
See application file for complete search history.

(56) References Cited

U.S. PATENT DOCUMENTS

| | | |
|---|---|---|
| 2010/0290545 A1 | 11/2010 | Kim et al. |
| 2010/0329383 A1 | 12/2010 | Moon et al. |
| 2012/0327879 A1* | 12/2012 | Stadelmeier ......... H04B 7/0689 370/329 |
| 2013/0177100 A1 | 7/2013 | Kim et al. |

FOREIGN PATENT DOCUMENTS

| | | |
|---|---|---|
| KR | 10-2008-0104658 A | 12/2008 |
| KR | 10-2010-0051649 A | 5/2010 |
| WO | WO 2010/071272 A1 | 6/2010 |
| WO | WO 2011/105748 A2 | 9/2011 |

* cited by examiner

FIG. 16

| Reception Mode | | | Network Configuration |
|---|---|---|---|
| Fixed Rooftop (Directional-ant., 10m) | | | MFN, SFN |
| Handheld Portable | Fixed (Omni-ant., ~1.5m) | | MFN, SFN |
| | Pedestrian (Omni-ant., ~1.5m) | | MFN, SFN |
| Handheld Mobile: (Omni-ant., ~1.5m) | | | MFN, SFN |

| Reception Mode | | Network configuration | Guard interval | Guard interval (a) | Guard interval (b) |
|---|---|---|---|---|---|
| Fixed Rooftop (Directional-ant., 10m) | | MFN | NG_a1,NG_a2,... | (25us,50us) + L_alpha1 | (30us,60us) + L_beta1 |
| | | SFN | NG_b1,NG_b2,... | (200us,400us) + L_alpha2 | (240us,480us) + L_beta2 |
| Handheld Portable | Fixed: (Omni-ant., ~1.5m) | MFN | NG_c1,NG_c2,... | 100us + L_alpha1 | 120us + L_beta1 |
| | | SFN | NG_d1,NG_d2,... | (200us,400us) + L_alpha2 | (240us,480us) + L_beta2 |
| | Pedestrian: (Omni-ant., ~1.5m) | MFN | NG_e1,NG_e2,... | 100us + L_alpha1 | 120us + L_beta1 |
| | | SFN | NG_f1,NG_f2,... | (200us,400us) + L_alpha2 | (240us,480us) + L_beta2 |
| Handheld Mobile: (Omni-ant., ~1.5m) | | MFN | NG_g1,NG_g2,... | 100us + L_alpha1 | 120us + L_beta1 |
| | | SFN | NG_h1,NG_h2,... | (200us,400us) + L_alpha2 | (240us,480us) + L_beta2 |

(B)

| Reception Mode | | Network configuration | Vehicle speed | Vehicle speed (a) | Vehicle speed (b) |
|---|---|---|---|---|---|
| Fixed Rooftop (Directional-ant., 10m) | | MFN | Quasi static | Quasi static | Quasi static |
| | | SFN | Quasi static | Quasi static | Quasi static |
| Handheld Portable | Fixed: (Omni-ant., ~1.5m) | MFN | Quasi static | Quasi static | Quasi static |
| | | SFN | Quasi static | Quasi static | Quasi static |
| | Pedestrian: (Omni-ant., ~1.5m) | MFN | <V_p_a1 km/h | <3km/h+V_alpha1 | <3km/h+V_alpha2 |
| | | SFN | <V_p_b1 km/h | <3km/h+V_beta1 | <3km/h+V_beta2 |
| Handheld Mobile: (Omni-ant., ~1.5m) | | MFN | V_m_a1 km/h ~ V_m_a2 km/h | 3km/h+V_alpha1 ~ 200km/h+V_alpha2 | |
| | | SFN | V_m_b1 km/h ~ V_m_b2 km/h | 3km/h+V_beta1 ~ 200km/h+V_beta2 | |

FIG. 19

(A) Example (A)

| Channel BW | 6MHz | | | | | | | | | | | |
|---|---|---|---|---|---|---|---|---|---|---|---|---|
| NFFT | 8192 | | | | | 16384 | | | | | 32768 | |
| Nwaveform_scaling | 1 | | | | | 2 | | | | | 4 | |
| Npilotdensity | 20 | 40 | 80 | 160 | 320 | 20 | 40 | 80 | 160 | 320 | 20 | 40 | 80 | 160 | 320 |
| NcBW | 336 | 168 | 84 | 42 | | 688 | 344 | 172 | 86 | 43 | 1392 | 696 | 348 | 174 | 87 |
| a | 1 | | | | | 1 | | | | | 1 | | | | |
| NoC | 6721 | | | | | 13761 | | | | | 27841 | | | | |
| Fs (MHz) | 6.9063 | | | | | 6.9063 | | | | | 6.9063 | | | | |
| fc (KHz) | 0.8430 | | | | | 0.4215 | | | | | 0.2108 | | | | |
| Tu(us) | 1186.2 | | | | | 2372.3 | | | | | 4744.7 | | | | |
| cBW(MHz) | 5.6661 | | | | | 5.8006 | | | | | 5.8678 | | | | |
| cBW/BW | 0.9444 | | | | | 0.9668 | | | | | 0.9780 | | | | |

$Fs = 221/32\ MHz = 6.9063\ MHz$ (B) Example (B)

| Channel BW | 6MHz | | | | | | | | | | | |
|---|---|---|---|---|---|---|---|---|---|---|---|---|
| NFFT | 8192 | | | | | 16384 | | | | | 32768 | |
| Nwaveform_scaling | 1 | | | | | 2 | | | | | 4 | |
| Npilotdensity | 16 | 32 | 64 | 128 | 256 | 16 | 32 | 64 | 128 | 256 | 16 | 32 | 64 | 128 | 256 |
| NcBW | 424 | 212 | 106 | 53 | | 864 | 432 | 216 | 108 | 54 | 1760 | 880 | 440 | 220 | 110 |
| a | 1 | | | | | 2 | | | | | 4 | | | | |
| NoC | 6785 | | | | | 13825 | | | | | 28161 | | | | |
| Fs (MHz) | 6.8477 | | | | | 6.8477 | | | | | 6.8477 | | | | |
| fc (KHz) | 0.8359 | | | | | 0.4179 | | | | | 0.2090 | | | | |
| Tu(us) | 1196.3 | | | | | 2392.6 | | | | | 4785.3 | | | | |
| cBW(MHz) | 5.6716 | | | | | 5.7781 | | | | | 5.8849 | | | | |
| cBW/BW | 0.9453 | | | | | 0.9630 | | | | | 0.9808 | | | | |

$Fs = 1753/256\ MHz = 6.8477\ MHz$

GI duration for combination of FFT and GI mode (A')

| | 1/160 | 1/80 | 1/40 | 1/20 | 1/10 | 1/5 |
|---|---|---|---|---|---|---|
| 8192 | - | - | 25us | 50us | 100us | 200us |
| 16384 | - | 25us | 50us | 100us | 200us | 400us |
| 32768 | 25us | 50us | 100us | 200us | 400us | - |

(B')

| | 1/160 | 1/80 | 1/40 | 1/20 | 1/10 | 1/5 |
|---|---|---|---|---|---|---|
| 8192 | - | - | 29.9us | 59.8us | 119.6us | 239.3us |
| 16384 | - | 29.9us | 59.8us | 119.6us | 239.3us | 478.5us |
| 32768 | 29.9us | 59.8us | 119.6us | 239.3us | 478.5us | - |

Example (A)

| Channel BW | 6MHz | | | | | | | | | | | | |
|---|---|---|---|---|---|---|---|---|---|---|---|---|
| NFFT | 8192 | | | | | 16384 | | | | | 32768 | | |
| Nwaveform_scaling | 1 | | | | | 2 | | | | | 4 | | |
| Npilotdensity | 20 | 40 | 80 | 160 | 320 | 20 | 40 | 80 | 160 | 320 | 20 | 40 | 80 | 160 | 320 |
| NeBW | 336 | 168 | 84 | 42 | — | 683 | 344 | 172 | 86 | 43 | 1392 | 696 | 348 | 174 | 87 |
| a | 1 | | | | | 1 | | | | | 1 | | | | |
| NoC | 6721 | | | | | 13761 | | | | | 27841 | | | | |
| Fs(MHz) | 6.9063 | | | | | 6.9063 | | | | | 6.9063 | | | | |
| fc(KHz) | 0.8430 | | | | | 0.4215 | | | | | 0.2108 | | | | |
| Tu(us) | 1186.2 | | | | | 2372.3 | | | | | 4744.7 | | | | |
| eBW(MHz) | 5.6661 | | | | | 5.8006 | | | | | 5.8678 | | | | |
| eBW/BW | 0.9444 | | | | | 0.9668 | | | | | 0.9780 | | | | |

$Fs = 221/32\ MHz = 6.9063\ MHz$ (B)

Example (B)

| Channel BW | 6MHz | | | | | | | | | | | | |
|---|---|---|---|---|---|---|---|---|---|---|---|---|
| NFFT | 8192 | | | | | 16384 | | | | | 32768 | | |
| Nwaveform_scaling | 1 | | | | | 2 | | | | | 4 | | |
| Npilotdensity | 16 | 32 | 64 | 128 | 256 | 16 | 32 | 64 | 128 | 256 | 16 | 32 | 64 | 128 | 256 |
| NeBW | 424 | 212 | 106 | 53 | — | 864 | 432 | 216 | 108 | 54 | 1760 | 880 | 440 | 220 | 110 |
| a | 1 | | | | | 1 | | | | | 1 | | | | |
| NoC | 6785 | | | | | 13825 | | | | | 28161 | | | | |
| Fs(MHz) | 6.8477 | | | | | 6.8477 | | | | | 6.8477 | | | | |
| fc(KHz) | 0.8359 | | | | | 0.4179 | | | | | 0.2090 | | | | |
| Tu(us) | 1196.3 | | | | | 2392.6 | | | | | 4785.3 | | | | |
| eBW(MHz) | 5.6716 | | | | | 5.7781 | | | | | 5.8849 | | | | |
| eBW/BW | 0.9453 | | | | | 0.9630 | | | | | 0.9808 | | | | |

$Fs = 1753/256\ MHz = 6.8477\ MHz$

GI duration for combination of FFT and GI mode (A')

| | 1/160 | 1/80 | 1/40 | 1/20 | 1/10 | 1/5 |
|---|---|---|---|---|---|---|
| 8192 | — | — | 25us | 50us | 100us | 200us |
| 16384 | — | 25us | 50us | 100us | 200us | 400us |
| 32768 | 25us | 50us | 100us | 200us | 400us | — |

(B')

| | 1/160 | 1/80 | 1/40 | 1/20 | 1/10 | 1/5 |
|---|---|---|---|---|---|---|
| 8192 | — | — | 29.9us | 59.8us | 119.6us | 239.3us |
| 16384 | — | 29.9us | 59.8us | 119.6us | 239.3us | 478.5us |
| 32768 | 29.9us | 59.8us | 119.6us | 239.3us | 478.5us | — |

| | Example (B-2) | | | | | | | | | | | | |
|---|---|---|---|---|---|---|---|---|---|---|---|---|---|
| Channel BW | 6MHz | | | | | | | | | | | | |
| NFFT | 8192 | | | | 16384 | | | | | 32768 | | | |
| Nwaveform_scaling | 1 | | | | 2 | | | | | 4 | | | |
| Npilotdensity | 16 | 32 | 64 | 128 | 16 | 32 | 64 | 128 | 256 | 16 | 32 | 64 | 128 | 256 |
| NeBW | 424 | 212 | 106 | 53 | 864 | 432 | 216 | 108 | 54 | 1760 | 880 | 440 | 220 | 110 |
| a | 1 | | | | 1 | | | | | 1 | | | |
| NoC | 6785 | | | | 13825 | | | | | 28161 | | | |
| Fs (MHz) | 6.84375 | | | | 6.84375 | | | | | 6.84375 | | | |
| fc(KHz) | 0.8354 | | | | 0.4177 | | | | | 0.2089 | | | |
| Tu(us) | 1197.00 | | | | 2394.01 | | | | | 4788.02 | | | |
| eBW(MHz) | 5.6683 | | | | 5.7748 | | | | | 5.8816 | | | |
| eBWBW | 0.9447 | | | | 0.9625 | | | | | 0.9803 | | | |

$Fs = 219/32\ MHz = 6.84375\ MHz$

| | 1/160 | 1/80 | 1/40 | 1/20 | 1/10 | 1/5 |
|---|---|---|---|---|---|---|
| 8192 | - | - | 29.9us | 59.9us | 119.7us | 239.4us |
| 16384 | - | 29.9us | 59.9us | 119.7us | 239.4us | 478.8us |
| 32768 | 29.9us | 59.9us | 119.7us | 239.4us | 478.8us | - |

| Scaling factor | 5MHz | 6MHz | 7MHz | 8MHz |
|---|---|---|---|---|
| Fs (A) | 5/6 | 1 | 7/6 | 8/6 |
| | 1105/192 | 221/32 | 1547/192 | 221/24 |
| Fs (B-1) | 8765/1536 | 1753/256 | 1227/1536 | 1753/192 |
| Fs (B-2) | 365/64 | 219/32 | 511/64 | 73/8 |

(B)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7552 | 5.7552 | 5.7552 | 6.9063 | 6.9063 | 6.9063 | 8.0573 | 8.0573 | 8.0573 | 9.2083 | 9.2083 | 9.2083 |
| fc (KHz) | 0.7025 | 0.3513 | 0.1756 | 0.8430 | 0.4215 | 0.2108 | 0.9836 | 0.4918 | 0.2459 | 1.1241 | 0.5620 | 0.2810 |
| Ts (us) | 1423.4 | 2846.8 | 5693.6 | 1186.2 | 2372.3 | 4744.7 | 1016.7 | 2033.4 | 4066.9 | 889.6 | 1779.3 | 3558.5 |
| NoC | 6721 | 13761 | 27841 | 6721 | 13761 | 27841 | 6721 | 13761 | 27841 | 6721 | 13761 | 27841 |
| eBW (MHz) | 4.7218 | 4.8335 | 4.8899 | 5.6661 | 5.8006 | 5.8678 | 6.6105 | 6.7674 | 6.8458 | 7.5548 | 7.7344 | 7.8238 |
| eBW/BW | 0.9444 | 0.9668 | 0.9780 | 0.9444 | 0.9668 | 0.9780 | 0.9444 | 0.9668 | 0.9780 | 0.9444 | 0.9668 | 0.9780 |

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7064 | 5.7658 | 5.7658 | 6.8477 | 6.8477 | 6.8477 | 7.9889 | 7.9889 | 7.9889 | 9.1302 | 9.1302 | 9.1302 |
| fc (KHz) | 0.6966 | 0.3519 | 0.1760 | 0.8359 | 0.4179 | 0.2090 | 0.9752 | 0.4876 | 0.2438 | 1.1145 | 0.5573 | 0.2786 |
| Ts (us) | 1435.6 | 2841.6 | 5683.2 | 1196.3 | 2392.6 | 4785.3 | 1025.4 | 2050.8 | 4101.7 | 897.2 | 1794.3 | 3589.0 |
| NoC | 6785 | 13825 | 28161 | 6785 | 13825 | 28161 | 6785 | 13825 | 28161 | 6785 | 13825 | 28161 |
| eBW (MHz) | 4.7263 | 4.8652 | 4.9551 | 5.6716 | 5.7781 | 5.8849 | 6.6168 | 6.7411 | 6.8657 | 7.5621 | 7.7042 | 7.8466 |
| eBW/BW | 0.9453 | 0.9730 | 0.9910 | 0.9453 | 0.9630 | 0.9808 | 0.9453 | 0.9630 | 0.9808 | 0.9453 | 0.9630 | 0.9808 |

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7031 | 5.7031 | 5.7031 | 6.8438 | 6.8438 | 6.8438 | 7.9844 | 7.9844 | 7.9844 | 9.1250 | 9.1250 | 9.1250 |
| fc (KHz) | 0.6962 | 0.3481 | 0.1740 | 0.8354 | 0.4177 | 0.2089 | 0.9747 | 0.4873 | 0.2437 | 1.1139 | 0.5569 | 0.2785 |
| Ts (us) | 1436.4 | 2872.8 | 5745.6 | 1197.0 | 2394.0 | 4788.0 | 1026.0 | 2052.0 | 4104.0 | 897.8 | 1795.5 | 3591.0 |
| NoC | 6783 | 13825 | 28161 | 6785 | 13825 | 28161 | 6785 | 13825 | 28161 | 6785 | 13825 | 28161 |
| eBW (MHz) | 4.7236 | 4.8124 | 4.9013 | 5.0683 | 5.7748 | 5.8816 | 6.6130 | 6.7373 | 6.8618 | 7.5578 | 7.6998 | 7.8421 |
| eBW/BW | 0.9447 | 0.9625 | 0.9803 | 0.9447 | 0.9625 | 0.9803 | 0.9447 | 0.9625 | 0.9803 | 0.9447 | 0.9625 | 0.9803 |

FIG. 24

| Reception Mode | | Network configuration | NFFT | Guard interval (a) | Guard interval (b) | Vehicle speed |
|---|---|---|---|---|---|---|
| Fixed Rooftop | | MFN | 16k, 32k | (25us,50us) + kalpha1 | (30us,60us) + beta1 | Quasi static |
| | | SFN | | (200us,400us)+ Lalpha2 | (240us,480us) ±beta2 | Quasi static |
| Handheld Portable | Fixed | MFN | 8k,16k, 32k | 100us+ Lalpha1 | 120us+ Lbeta1 | Quasi static |
| | | SFN | | (200us,400us)± Lalpha2 | (240us,480us) ±beta2 | Quasi static |
| | Pedestrian | MFN | | 100us+ Lalpha1 | 120us+ Lbeta1 | <3km/h +Valpha1 |
| | | SFN | | (200us,400us)± Lalpha2 | (240us,480us) ±beta2 | <3km/h +Vbeta1 |
| Handheld Mobile: (Omni-ant.,~1.5m) | | MFN | 8k,16k | 100us+ Lalpha1 | 120us+ Lbeta1 | 3km/h +Valpha1+ 200km/h +Valpha2 |
| | | SFN | | (200us,400us) Lalpha2 | (240us,480us) Lbeta2 | 3km/h +Vbeta1+ 200km/h +Vbeta2 |

FIG. 26

Pilot Pattern

| Density | PP pattern | Dx | Dy (SISO, MIXO-1) | Dy (MIXO-2) |
|---|---|---|---|---|
| 16 | PP5-4 | 5 | 4 | 8 |
|  | PP10-2 | 10 | 2 | 4 |
| 32 | PP5-8 | 5 | 8 | 16 |
|  | PP10-4 | 10 | 4 | 8 |
|  | PP20-2 | 20 | 2 | 4 |
| 64 | PP10-8 | 10 | 8 | 16 |
|  | PP20-4 | 20 | 4 | 8 |
|  | PP40-2 | 40 | 2 | 4 |
| 128 | PP20-8 | 20 | 8 | 16 |
|  | PP40-4 | 40 | 4 | 8 |
|  | PP80-2 | 80 | 2 | 4 |
| 256 | PP40-8 | 40 | 8 | 16 |
|  | PP80-4 | 80 | 4 | 8 |
|  | PP160-2 | 160 | 2 | 4 |

(A)

Pilot pattern configuration for SISO and MIXO-1 (more overhead version)

| PP mode | 30us | 60us | 120us | 240us | 480us |
|---|---|---|---|---|---|
| 8192 | PP40-2 | PP20-2 | PP10-2 | - | - |
|  | PP40-4 | PP20-4 | PP10-4 | PP5-4 | - |
|  | PP40-8 | PP20-8 | PP10-8 | PP5-8 | - |
| 16384 | PP40-2 | PP20-2 | PP10-2 | PP10-2 | - |
|  | PP80-2 | PP40-2 | PP20-2 | PP10-4 | PP5-4 |
|  | PP80-4 | PP40-4 | PP20-4 | PP10-4 | PP5-4 |
| 32768 | PP160-2 | PP80-2 | PP40-2 | PP20-2 | PP10-2 |

(B)

Pilot pattern configuration for MIXO-2 (less mobility version)

| PP mode | 30us | 60us | 120us | 240us | 480us |
|---|---|---|---|---|---|
| 8192 | PP40-4 | PP20-4 | PP10-4 | - | - |
|  | PP40-8 | PP20-8 | PP10-8 | PP5-8 | - |
|  | PP40-16 | PP20-16 | PP10-16 | PP5-16 | - |
| 16384 | PP40-4 | PP20-4 | PP10-4 | PP10-4 | - |
|  | PP80-4 | PP40-4 | PP20-4 | PP10-8 | PP5-8 |
|  | PP80-8 | PP40-8 | PP20-8 | PP10-8 | PP5-8 |
| 32768 | PP160-4 | PP80-4 | PP40-4 | PP20-4 | PP10-4 |

Pilot Pattern (A)

| Density | PP pattern | Dx | Dy (SISO, MIXO-1) | Dy (MIXO-2) |
|---|---|---|---|---|
| 16 | PP4-4 | 4 | 4 | 8 |
|  | PP8-2 | 8 | 2 | 4 |
| 32 | PP4-8 | 4 | 8 | 16 |
|  | PP8-4 | 8 | 4 | 8 |
|  | PP16-2 | 16 | 2 | 4 |
| 64 | PP8-8 | 8 | 8 | 16 |
|  | PP16-4 | 16 | 4 | 8 |
|  | PP32-2 | 32 | 2 | 4 |
| 128 | PP16-8 | 16 | 8 | 16 |
|  | PP32-4 | 32 | 4 | 8 |
|  | PP64-2 | 64 | 2 | 4 |
| 256 | PP32-8 | 32 | 8 | 16 |
|  | PP64-4 | 64 | 4 | 8 |
|  | PP128-2 | 128 | 2 | 4 |

Pilot pattern configuration for SISO and MIXO-1 (more overhead version)

(B)

| PP mode | 30us | 60us | 120us | 240us | 480us |
|---|---|---|---|---|---|
| 8192 | PP32-2 | PP16-2 | PP8-2 | - | - |
|  | PP32-4 | PP16-4 | PP4-4 | PP4-4 | - |
|  | PP32-8 | PP16-8 | PP4-8 | PP4-8 | - |
| 16384 | PP32-2 | PP16-2 | PP8-2 | PP8-2 | - |
|  | PP64-2 | PP32-2 | PP16-2 | PP8-4 | PP4-4 |
|  | PP64-4 | PP32-4 | PP16-4 | PP8-4 | PP4-4 |
| 32768 | PP128-2 | PP64-2 | PP32-2 | PP16-2 | PP16-2 |

Pilot pattern configuration for MIXO-2 (less mobility version)

| | 60us | 120us | 240us | 480us |
|---|---|---|---|---|
|  | PP20-4 | PP10-4 | - | - |
|  | PP20-8 | PP10-8 | PP5-8 | - |
|  | PP20-16 | PP10-16 | PP5-16 | - |
|  | PP20-4 | PP10-4 | PP10-4 | - |
|  | PP40-4 | PP20-4 | PP10-4 | - |
|  | PP40-8 | PP20-8 | PP10-8 | PP5-8 |
|  | PP80-4 | PP40-4 | PP20-4 | PP10-4 |

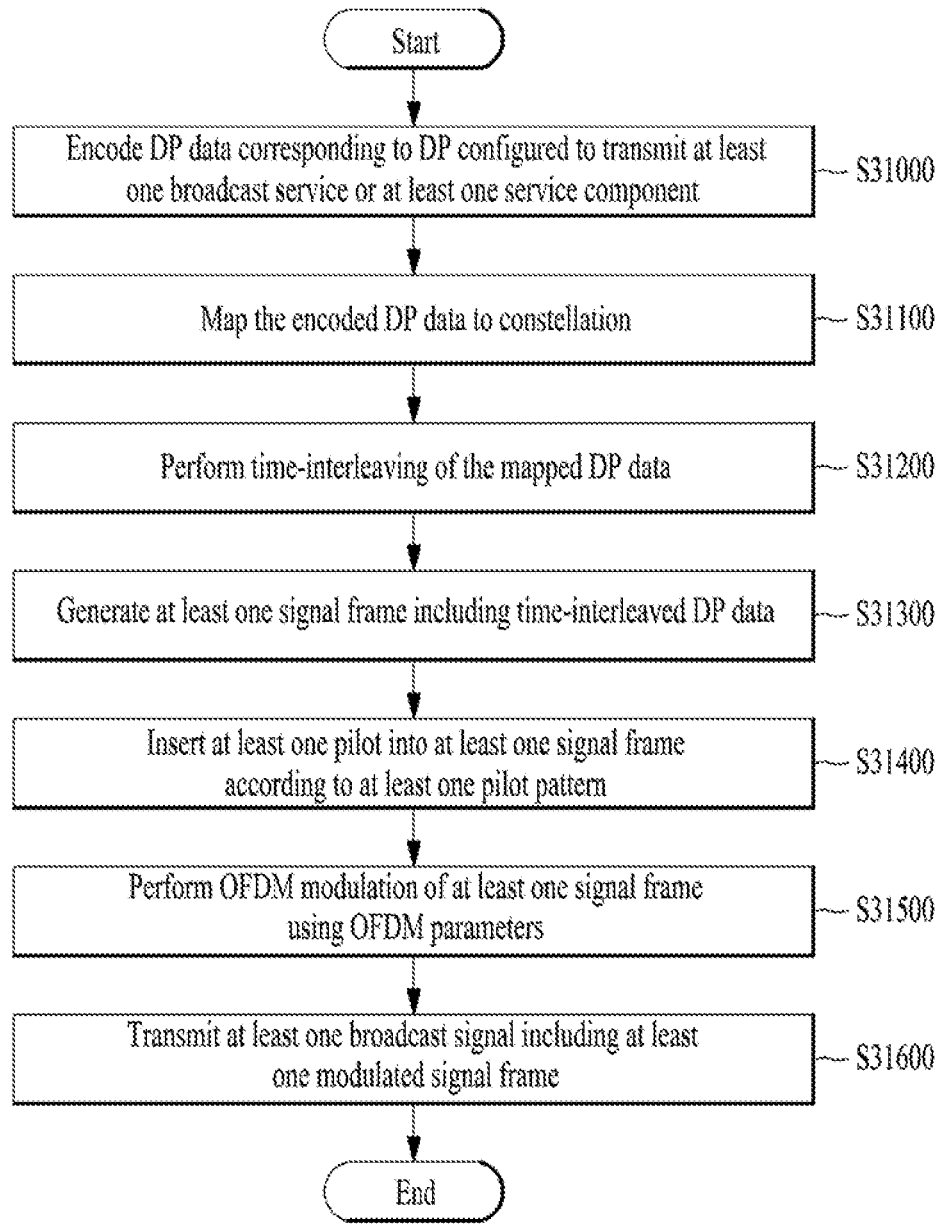

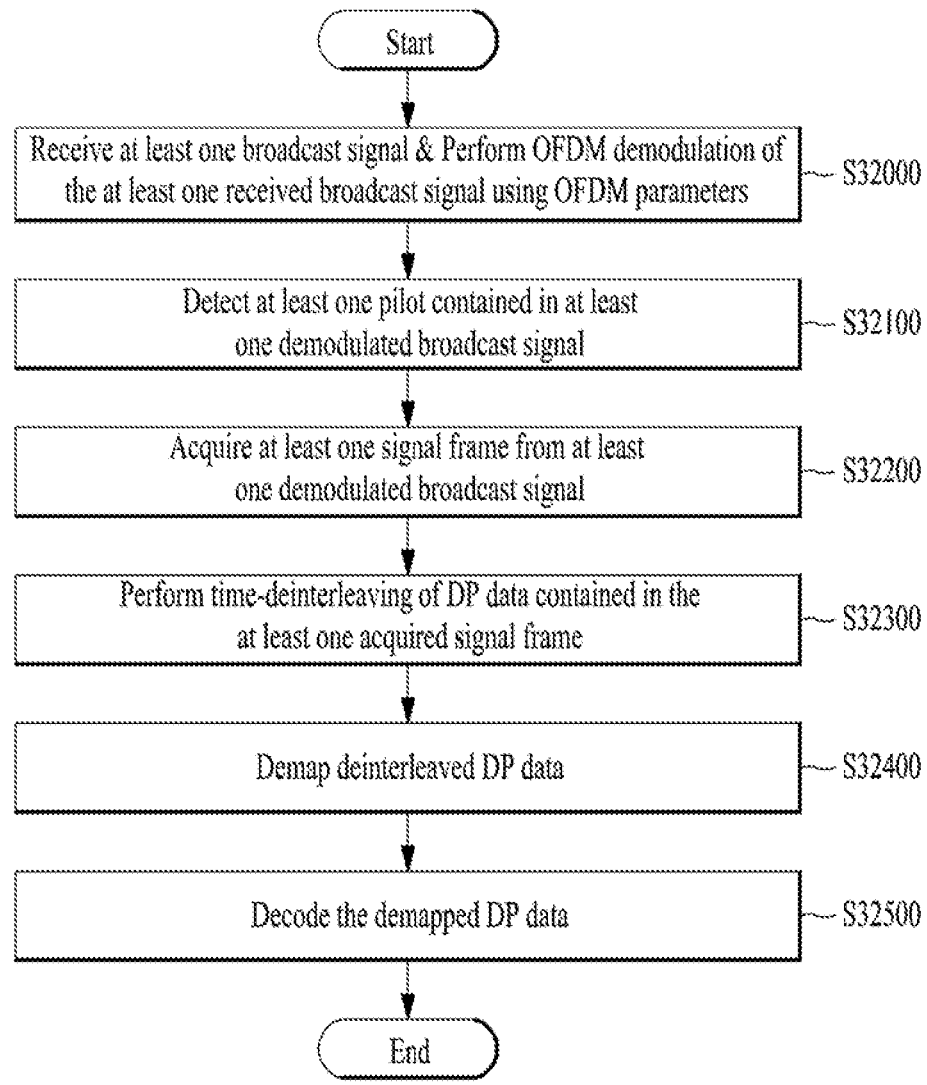

APPARATUS FOR TRANSMITTING BROADCAST SIGNAL, APPARATUS FOR RECEIVING BROADCAST SIGNAL, METHOD FOR TRANSMITTING BROADCAST SIGNAL, AND METHOD FOR RECEIVING BROADCAST SIGNAL

CROSS REFERENCE TO RELATED APPLICATIONS

This application is the National Phase of PCT International Application No. PCT/KR2014/004762, filed on May 28, 2014, which claims priority under 35 U.S.C. 119(e) to U.S. Provisional Application Nos. 61/827,755, filed on May 28, 2013; 61/837,129, filed on Jun. 19, 2013; and 61/847,535, filed on Jul. 17, 2013, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DISCLOSURE

Technical Problem

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

The object of the present invention can be achieved by providing a method for transmitting a broadcast signal, comprising: encoding Data Pipe (DP) data corresponding to Data Pipe (DP) configured to transmit at least one broadcast service or at least one service component, wherein the at least one broadcast service corresponds to any one of a broadcast service for a fixed receiver or a broadcast service for a mobile receiver; mapping the encoded DP data to constellation; time-interleaving the mapped DP data; generating at least one signal frame including the time-interleaved DP data; inserting at least one pilot into the at least one generated signal frame according to at least one pilot pattern, wherein the at least one pilot pattern is established in different ways according to a broadcast service for the fixed receiver or a broadcast service for the mobile receiver; OFDM (orthogonal frequency division multiplexing)-modulating the at least one generated signal frame using OFDM parameters, wherein the OFDM parameters are determined according to a Fast Fourier Transform (FFT) size; and transmitting at least one broadcast signal including the at least one modulated signal frame.

Advantageous Effects

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

DESCRIPTION OF DRAWINGS

FIG. 16 shows a table illustrating information related to a reception mode according to an embodiment of the present invention.

FIG. 18 shows tables including Tx parameters according to the embodiment of the present invention.

FIG. 19 shows a table including Tx parameters capable of optimizing the effective signal bandwidth (eBW) according to the embodiment.

FIG. 20 shows a table including Tx parameters for optimizing the effective signal bandwidth (eBW) according to another embodiment of the present invention.

FIG. 21 shows a Table including Tx parameters for optimizing the effective signal bandwidth (eBW) according to another embodiment of the present invention.

FIG. 22 shows Tx parameters according to another embodiment of the present invention.

FIG. 24 is a table showing information related to the reception mode according to another embodiment of the present invention.

FIG. 26 shows a Table in which pilot parameters are defined according to an embodiment of the present invention.

FIG. 27 shows a Table in which pilot parameters of another embodiment are defined according to an embodiment of the present invention.

FIG. 31 is a flowchart illustrating a method for transmitting a broadcast signal according to an embodiment of the present invention.

FIG. 32 is a flowchart illustrating a method for receiving a broadcast signal according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
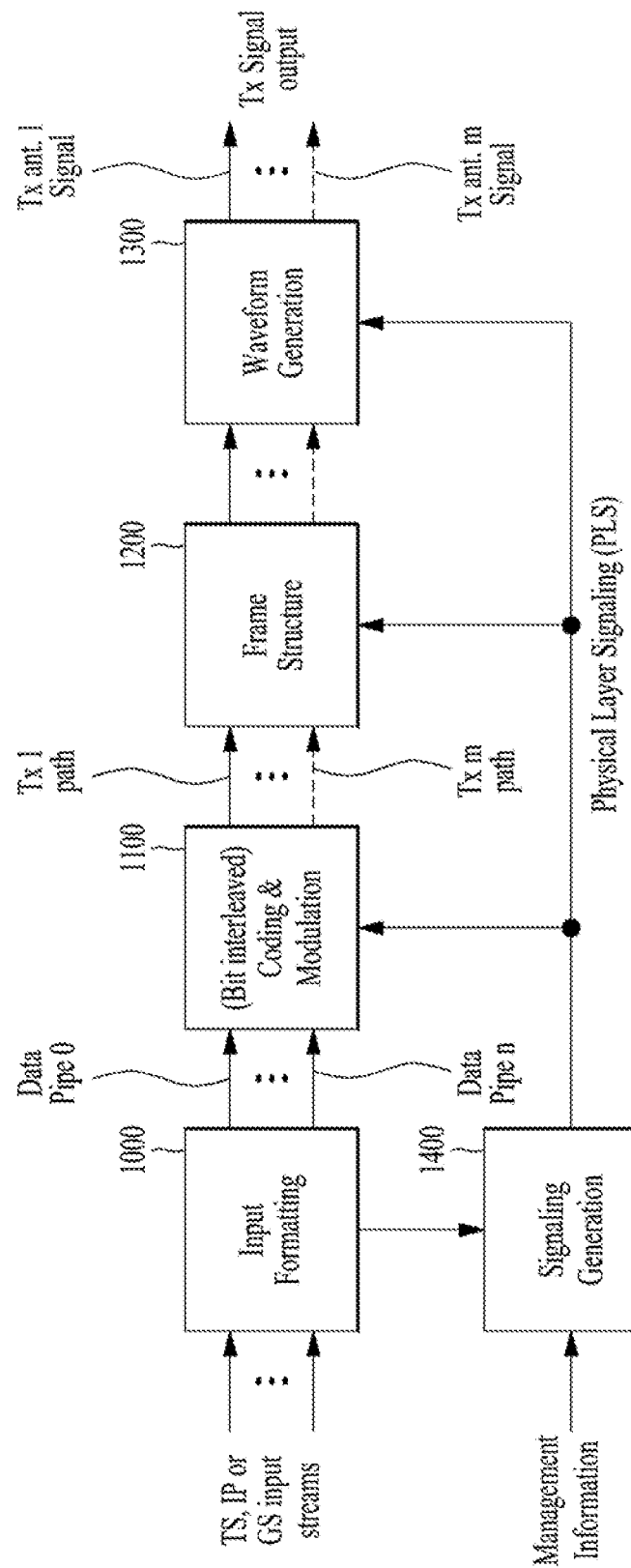
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
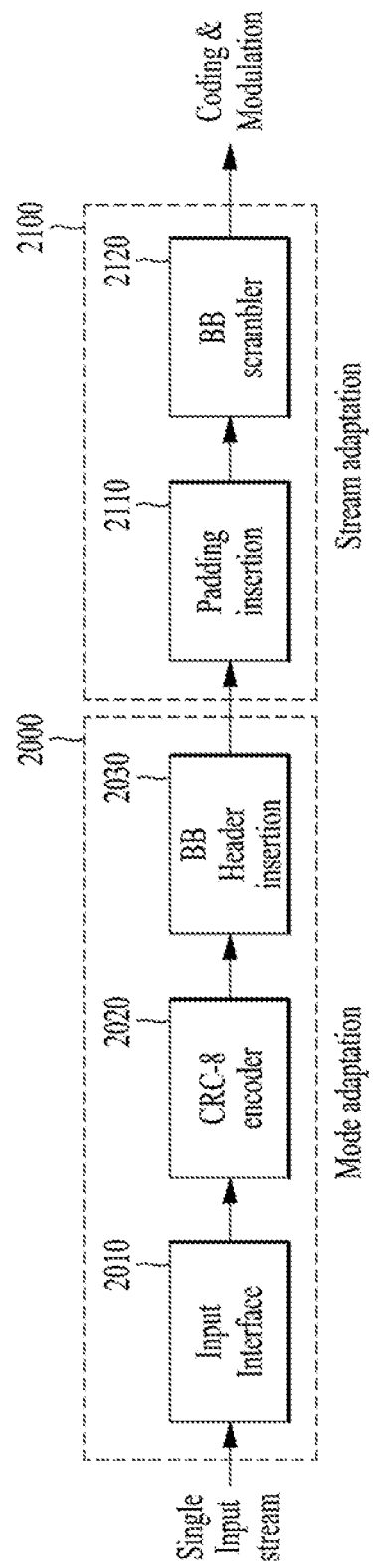
FIG. 2 illustrates an input formatting module according to an embodiment of the present invention.
Figure 3:
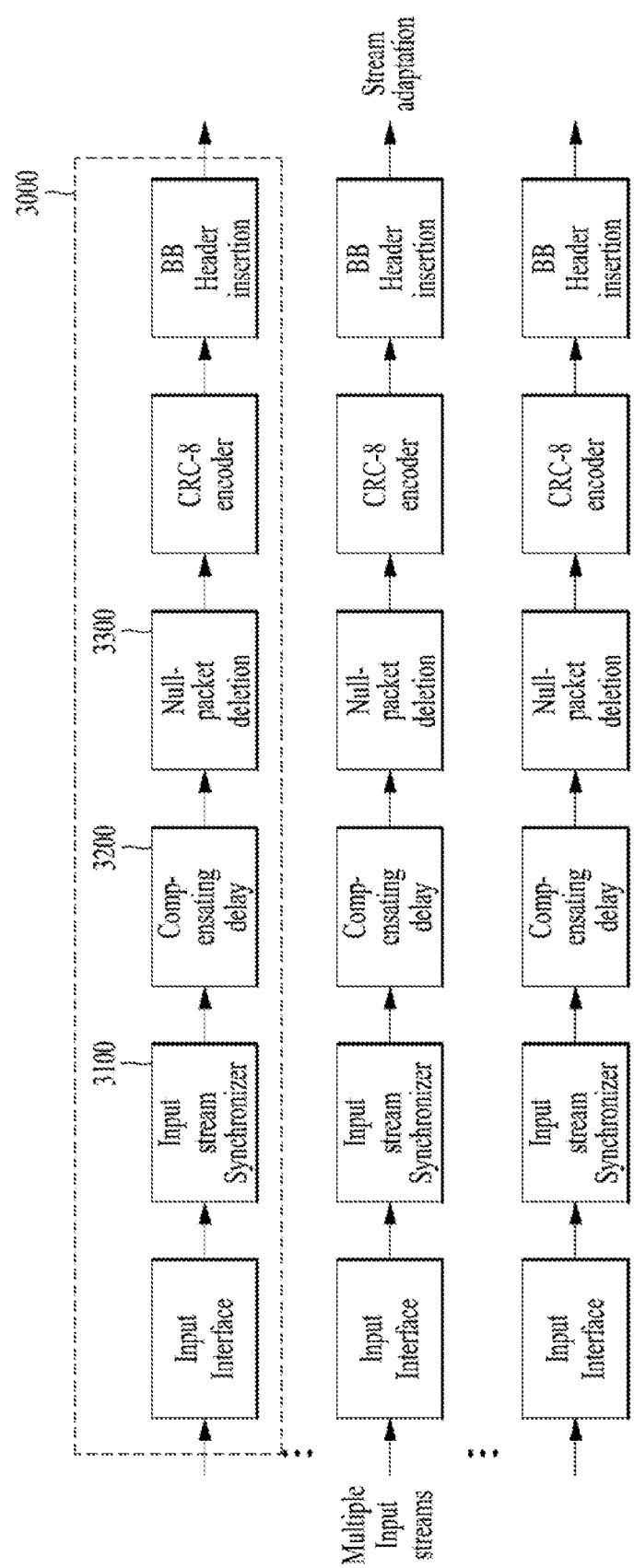
FIG. 3 illustrates an input formatting module according to another embodiment of the present invention.
Figure 4:
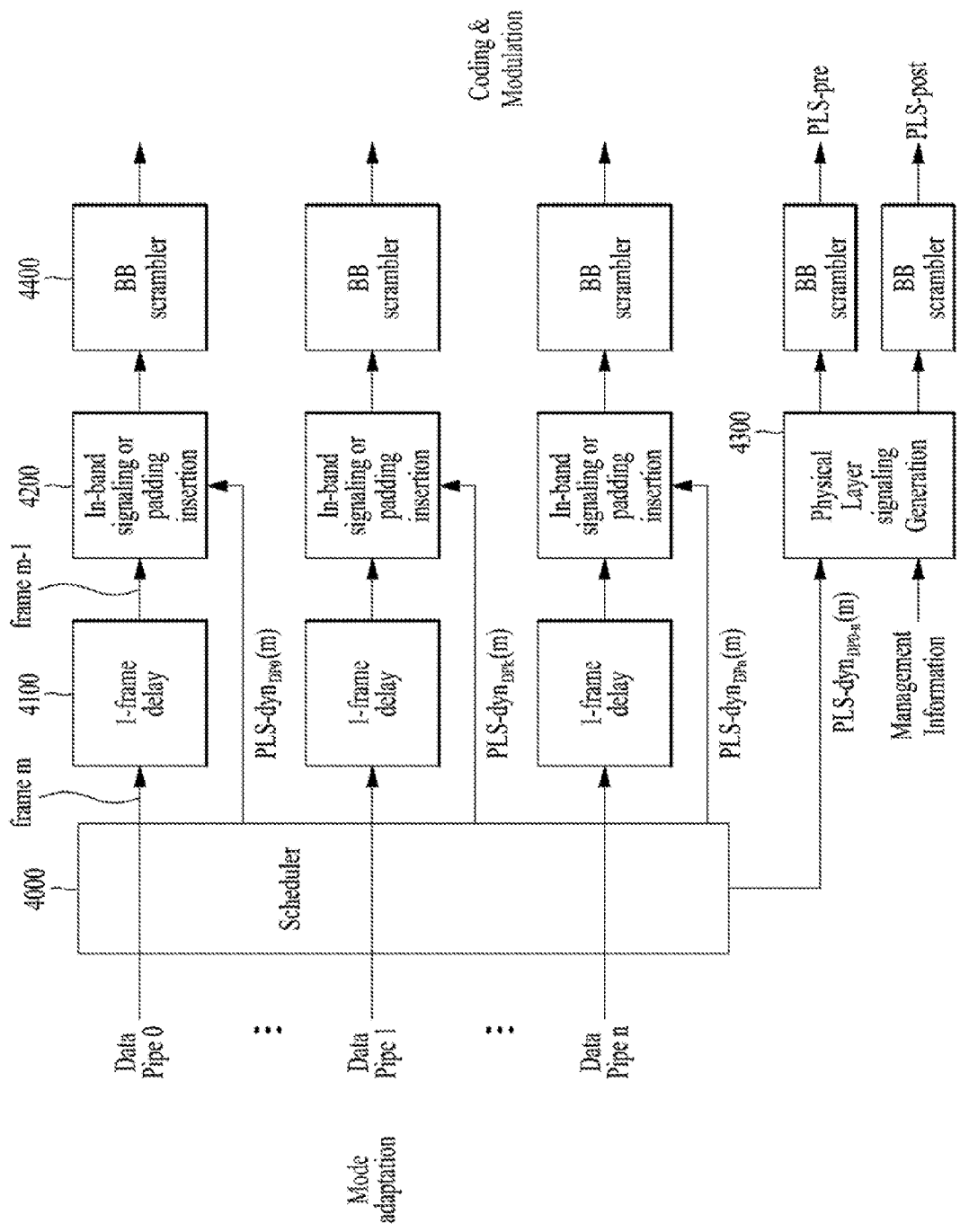
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
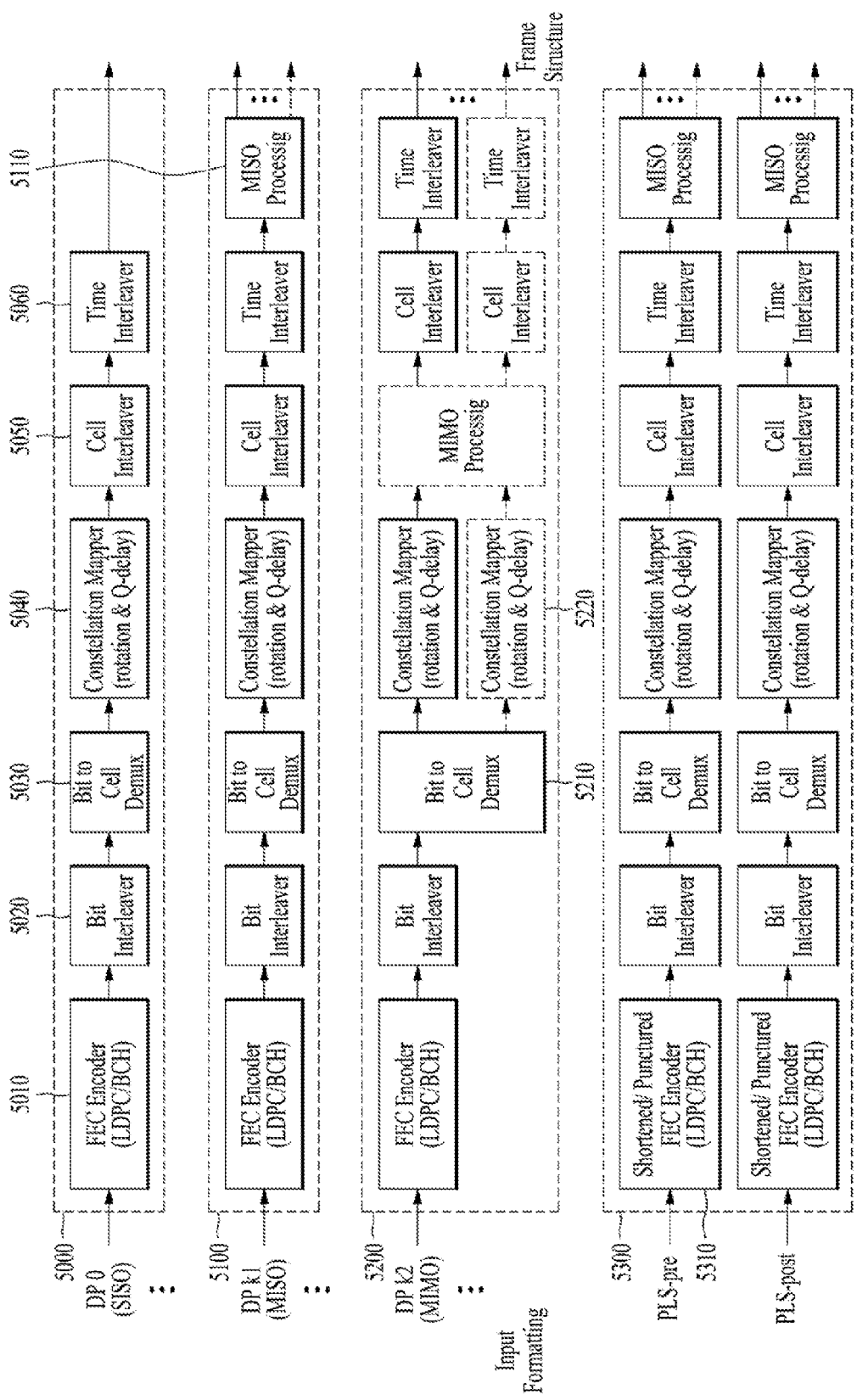
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
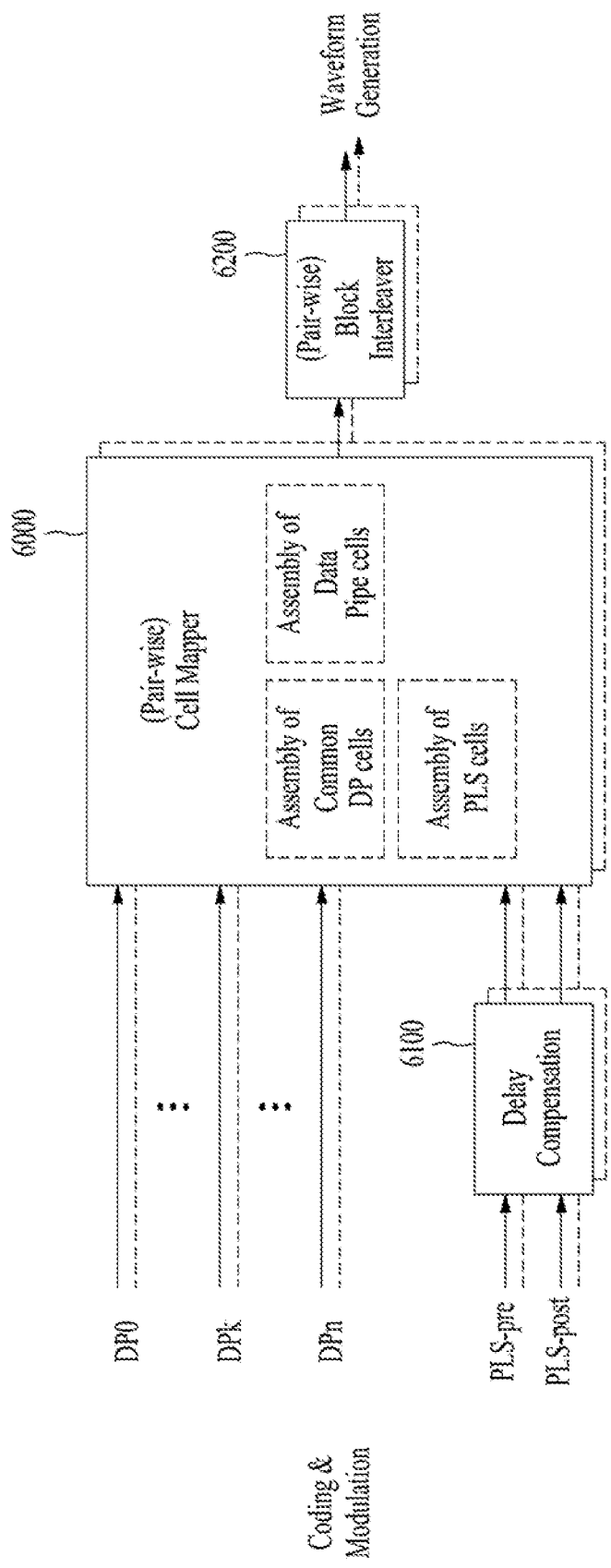
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
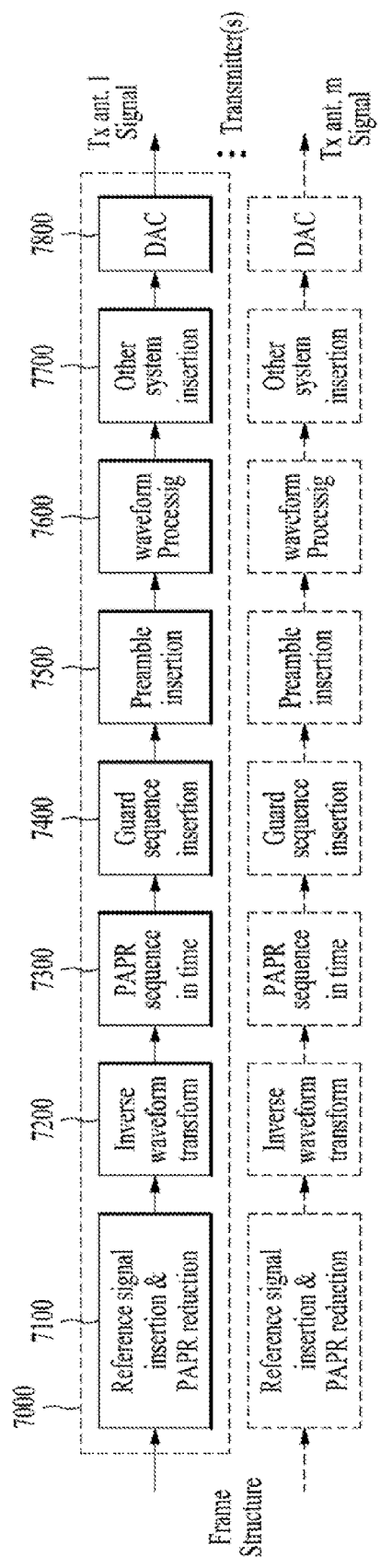
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
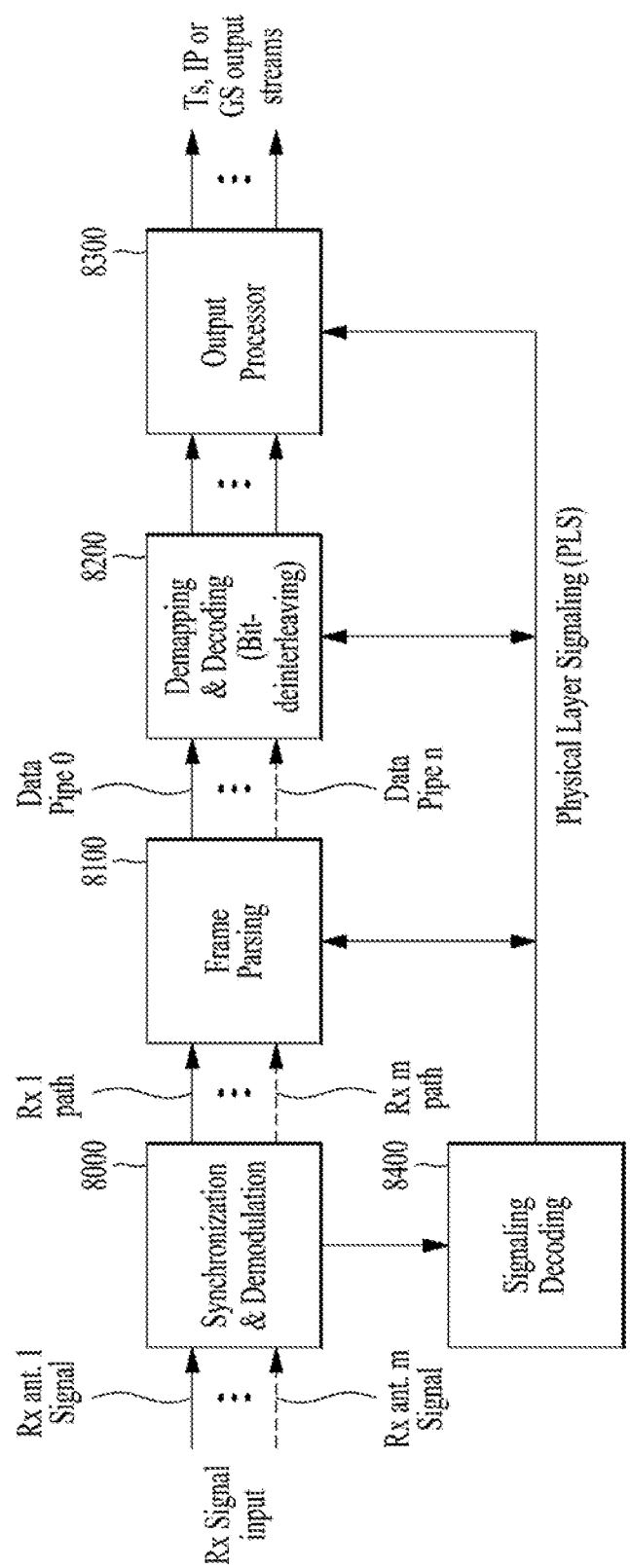
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
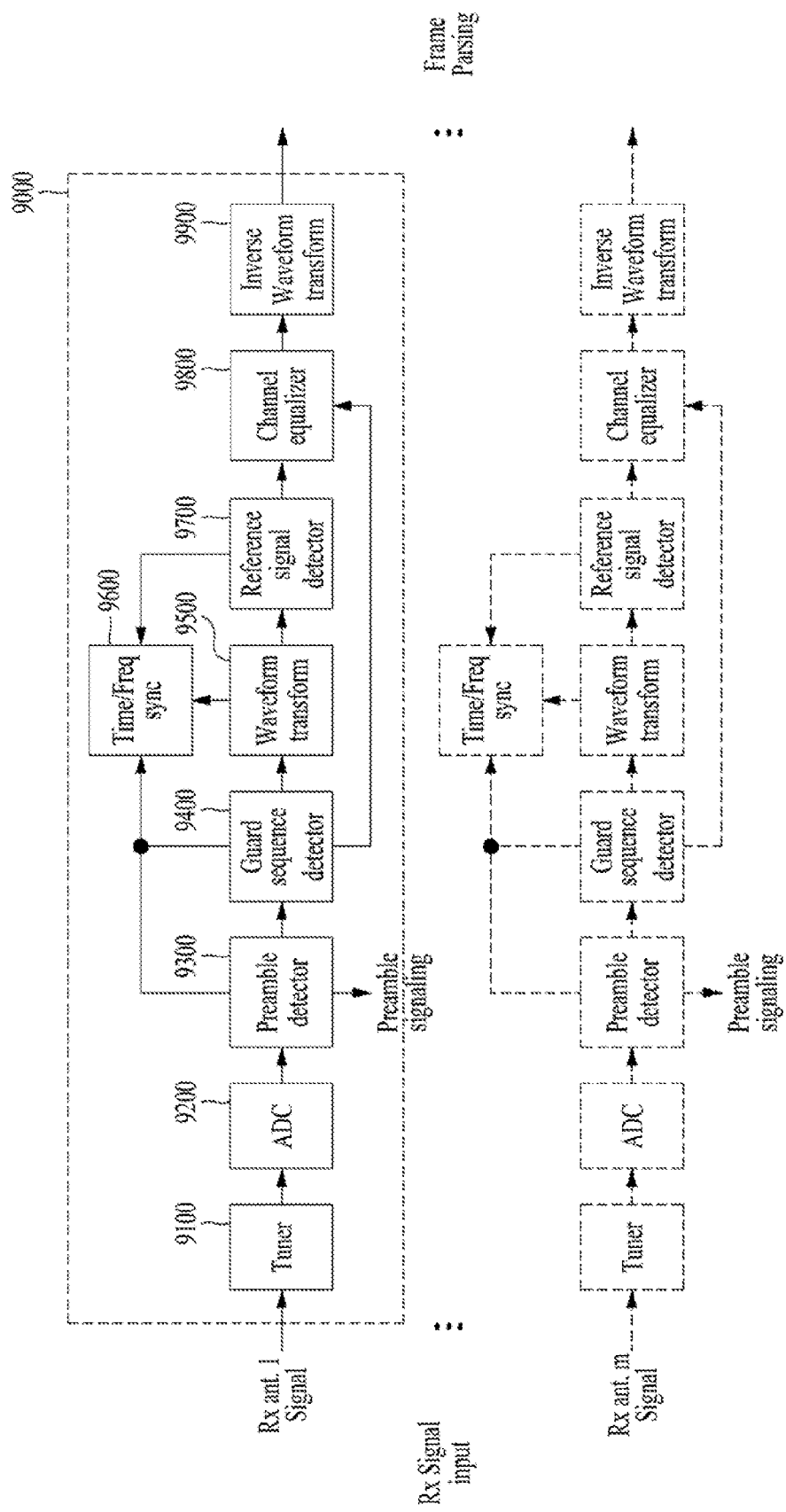
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
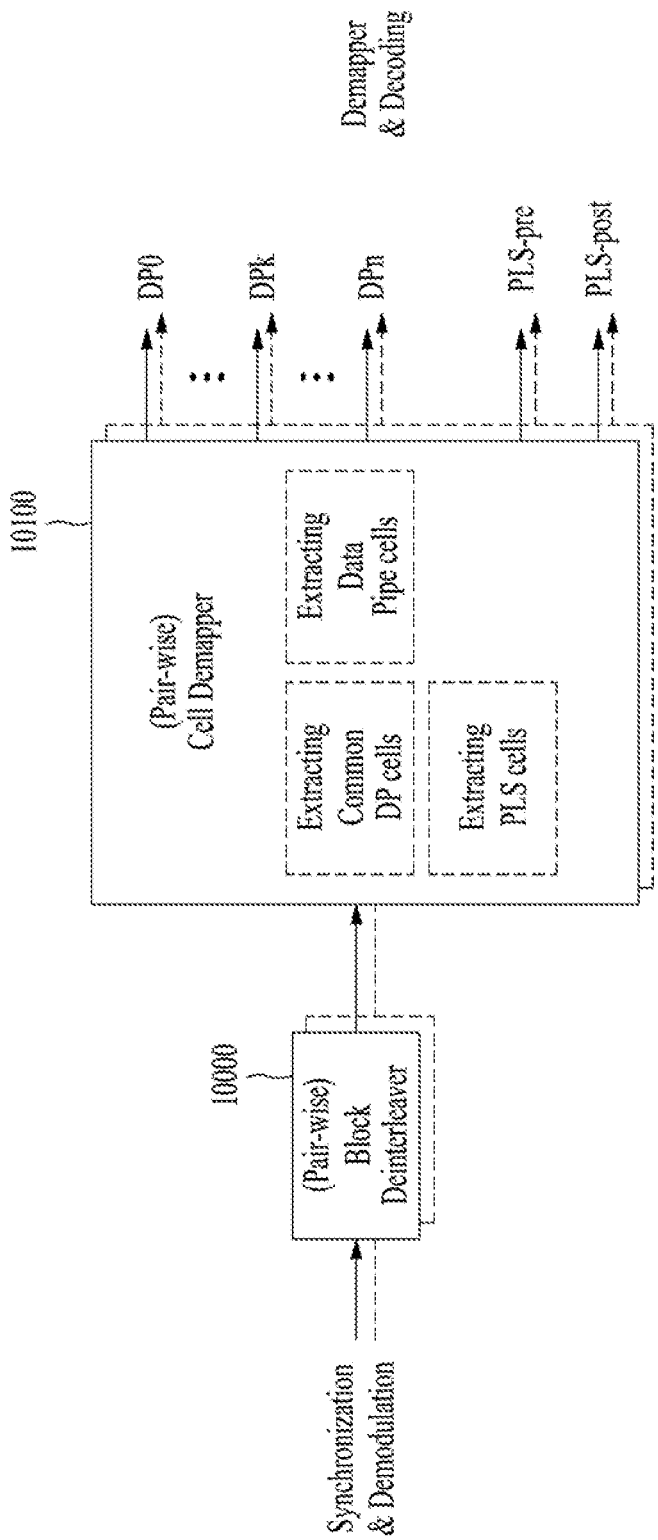
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
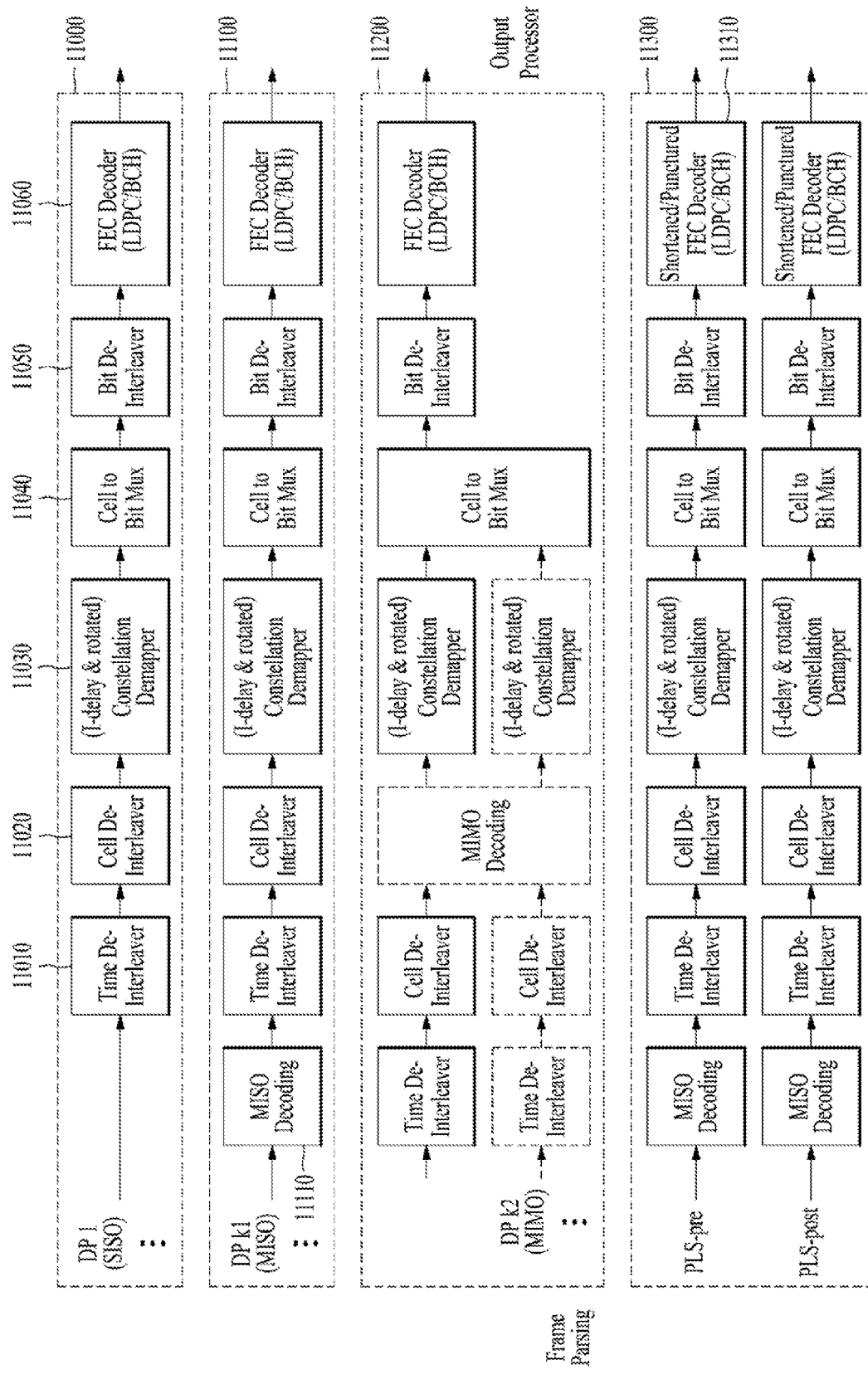
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
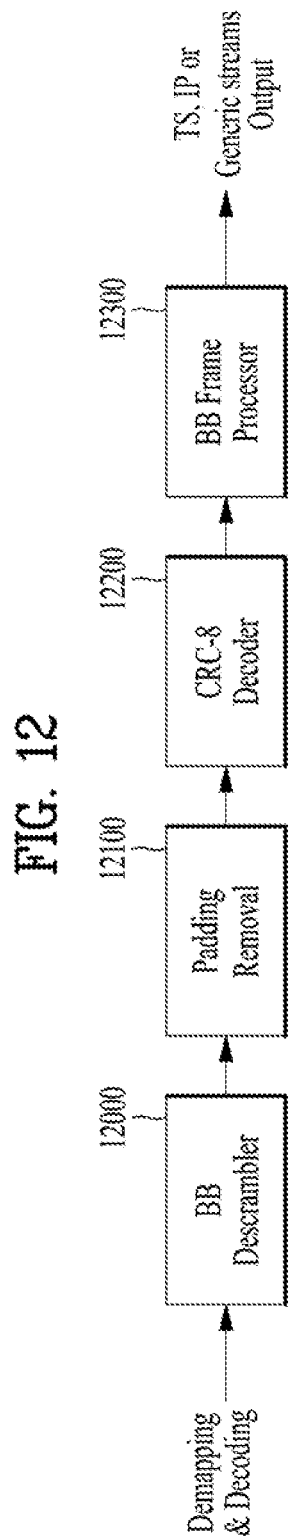
FIG. 12 illustrates an output processor according to an embodiment of the present invention.
Figure 13:
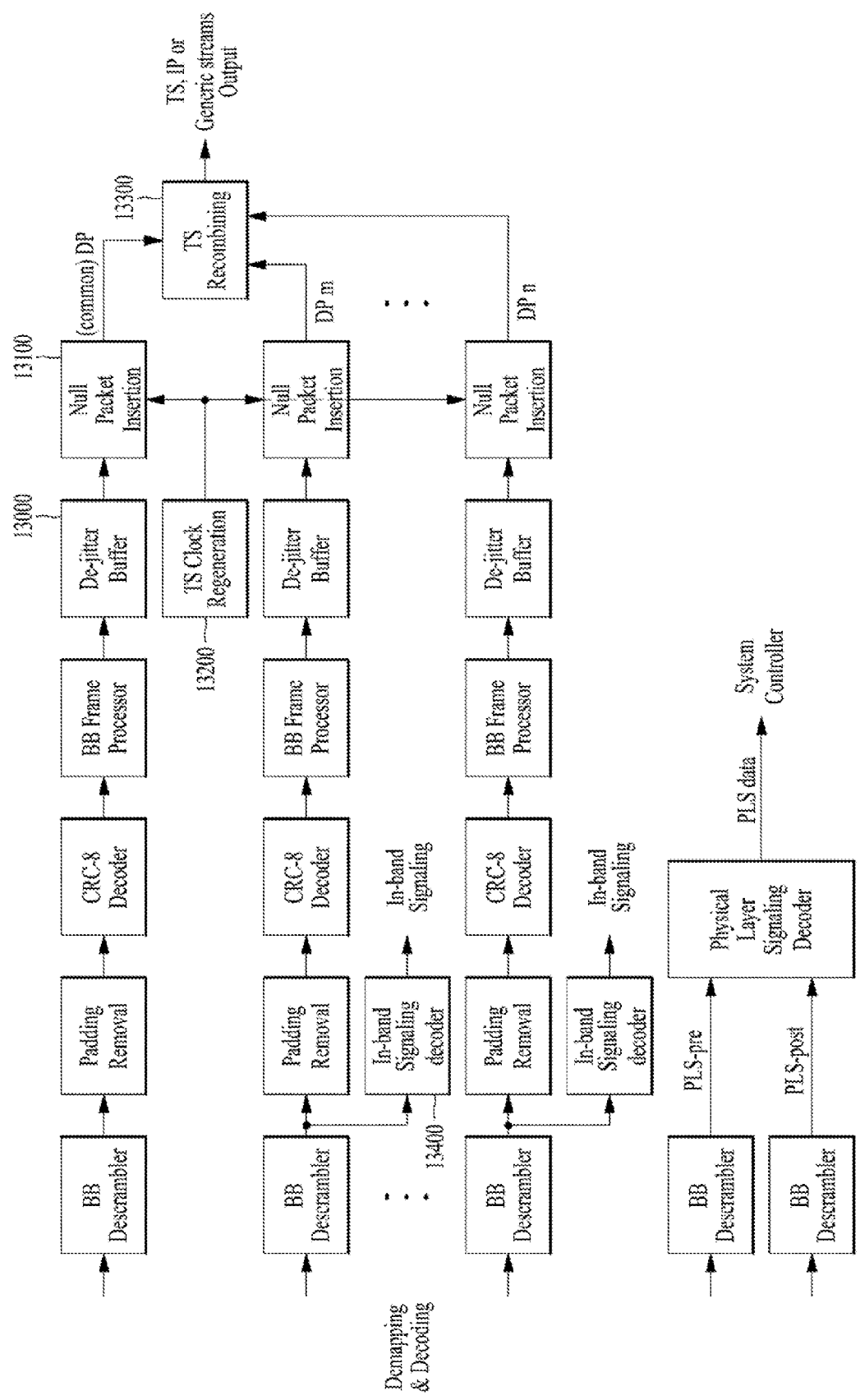
FIG. 13 illustrates an output processor according to another embodiment of the present invention.

FIGS. 12 and 13 illustrate output processors according to embodiments of the present invention.

FIG. 12 illustrates an output processor according to an embodiment of the present invention.

The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention.

The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
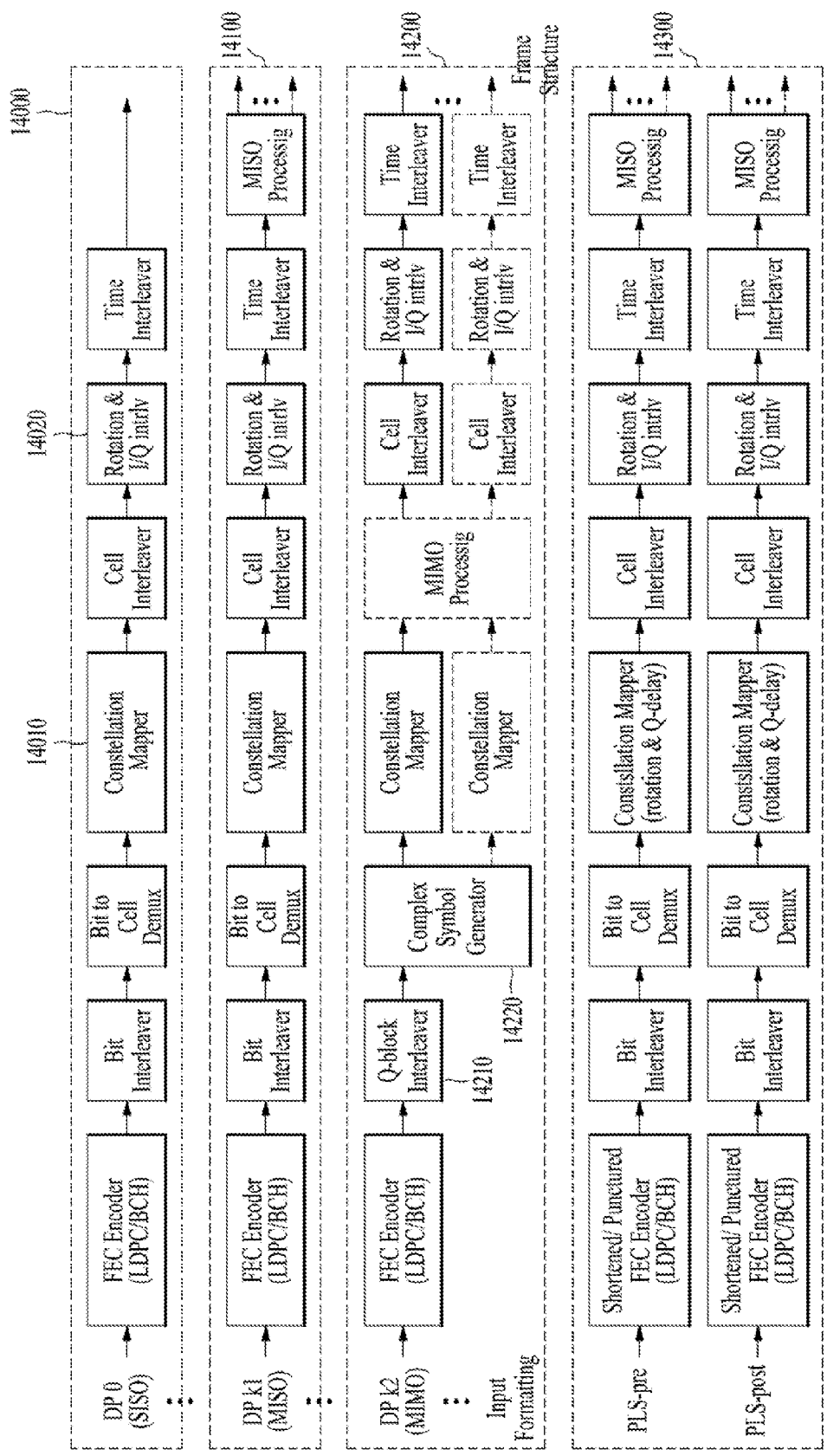
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
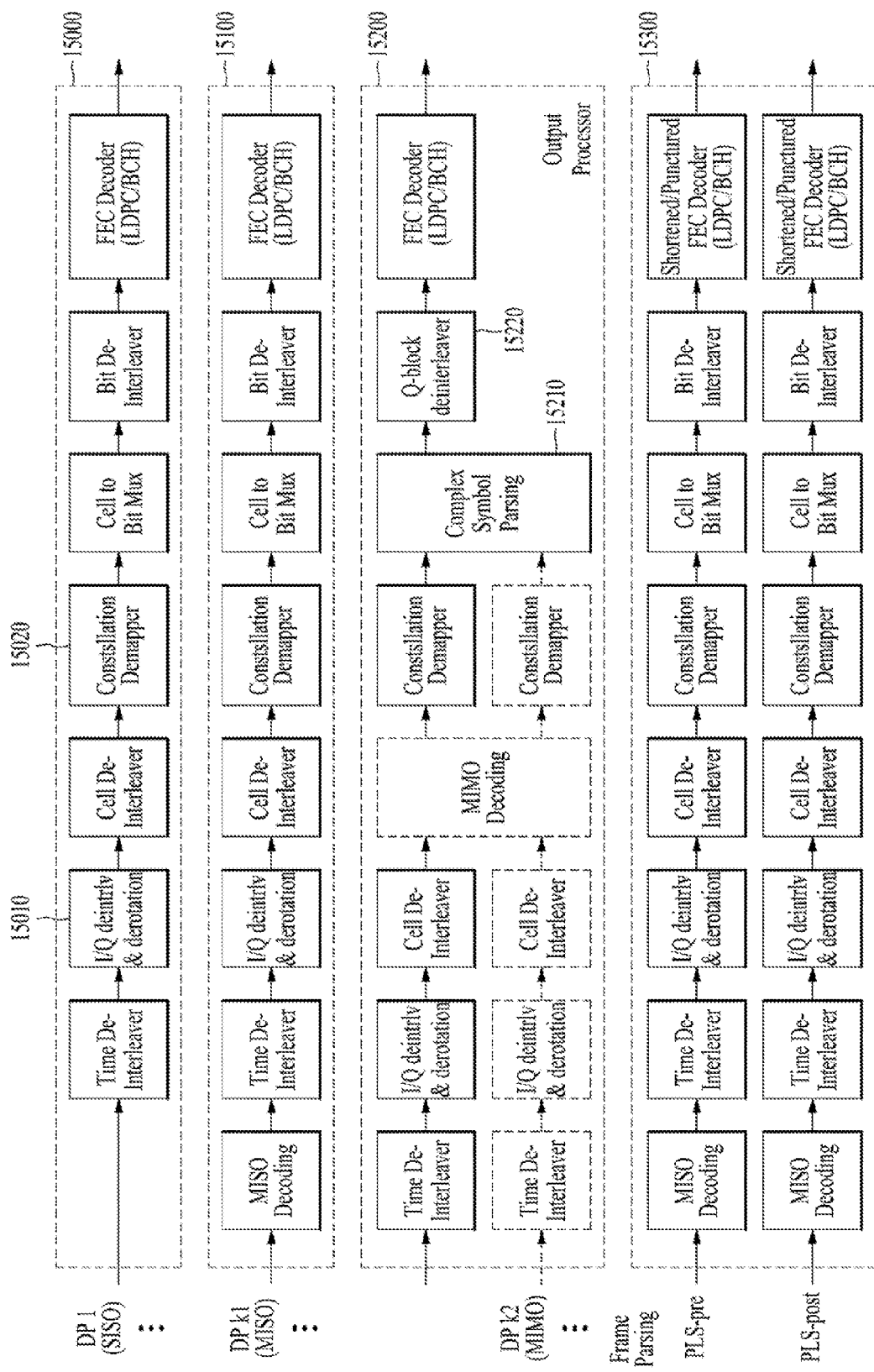
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the broadcast signal transmission apparatus according to an embodiment or the above-mentioned waveform transform block 7200 may insert pilots into a signal frame generated from a frame structure module 1200, and may OFDM-modulate broadcast signals using transmission (Tx) parameters. Tx parameters according to the embodiment may also be called OFDM parameters.

The present invention proposes Tx parameters that can satisfy a spectrum mask reference contained in a transmission (Tx) band for the next generation broadcast transmission/reception (Tx/Rx) system, can maximize Tx efficiency, and can be applied to a variety of Rx scenarios.

FIG. 16 shows a table illustrating information related to a reception mode according to an embodiment of the present invention.

A Table shown in FIG. 16 may include a network configuration according to a reception mode of the next generation broadcast Tx/Rx system.

As described above, the reception modes according to the embodiment can be classified into a Fixed Rooftop environment and a Handheld portable environment, and a representative channel for each environment can be decided.

In addition, the broadcast signal transmission apparatus according to the embodiment can decide the transmission (Tx) mode according to the above-mentioned reception mode. That is, the broadcast signal transmission apparatus according to the embodiment may process broadcast service data using the non-MIMO schemes (MISO and SISO schemes) or the MIMO scheme according to the broadcast service characteristics (i.e., according to the reception mode). Accordingly, the broadcast signal for each Tx mode may be transmitted and received through a Tx channel corresponding to the corresponding processing scheme.

In this case, according to one embodiment of the present invention, broadcast signals of individual Tx modes can be identified and transmitted in units of a signal frame. In addition, each signal frame may include a plurality of OFDM symbols. Each OFDM symbol may be comprised of the above-mentioned preamble (or preamble symbols) and a plurality of data symbols configured to transmit data corresponding to a broadcast signal.

A left column of the Table shown in FIG. 16 shows the above-mentioned three reception modes.

In case of the fixed rooftop environment, the broadcast signal reception apparatus may receive broadcast signals through the rooftop antenna located at the height of 10 ms or higher above the ground. Accordingly, since a direct path can be guaranteed, a Rician channel is representatively used, the Rician channel is less affected by Doppler shift, and the range of a delay spread may be limited according to the use of a directional antenna.

In case of the handheld portable environment and the handheld mobile environment, the broadcast signal reception apparatus may receive broadcast signals through the omni-directional antenna located at the height of 1.5 m or less above the ground. In this case, a Rayleigh channel may be representatively used as the Tx channel environment based on reflected waves, and may obtain the range of a delay spread of a channel longer than the directional antenna.

In case of the handheld portable environment, a low-level Doppler environment can be supported as the indoor/outdoor reception environments in consideration of mobility such as an adult walking speed. The handheld portable environment shown in FIG. 16 can be classified into the fixed environment and the pedestrian environment.

On the other hand, the handheld mobile environment must consider not only the walking speed of a receiving user, but also the moving speed of a vehicle, a train, etc. such that the handheld mobile environment can support a high Doppler environment.

A right column of the Table shown in FIG. 16 shows the network configuration for each reception mode.

The network configuration may indicate the network structure. The network configuration according to the embodiment can be classified into a Multi Frequency Network (MFN) composed of a plurality of frequencies and a Single Frequency Network (SFN) composed of a single frequency according to a frequency management method within the network.

MFN may indicate a network structure for transmitting a broadcast signal using many frequencies in a wide region. A plurality of transmission towers located at the same region or a plurality of broadcast signal transmitters may transmit the broadcast signal through different frequencies. In this case, the delay spread caused by a natural echo may be formed due to a topography, geographic features, etc. In addition, the broadcast signal receiver is designed to receive only one radio wave, such that the reception quality can be determined according to the magnitude of a received radio wave.

SFN may indicate a network structure in which a plurality of broadcast signal transmitters located at the same region can transmit the same broadcast signal through the same frequency. In this case, the maximum delay spread of a transmission (Tx) channel becomes longer due to the additional man-made echo. In addition, the reception (Tx) quality may be affected not only by a mutual ratio between a radio wave to be received and a radio wave of the jamming frequency, but also by a delay time, etc.

When deciding the Tx parameters, the guard interval value may be decided in consideration of the maximum delay spread of the Tx channel so as to minimize inter symbol interference. The guard interval may be a redundant data additionally inserted into the transmitted broadcast signal, such that it is necessary to design the entire symbol duration to minimize the loss of SNR in consideration of the entire Tx power efficiency.

Figure 17:
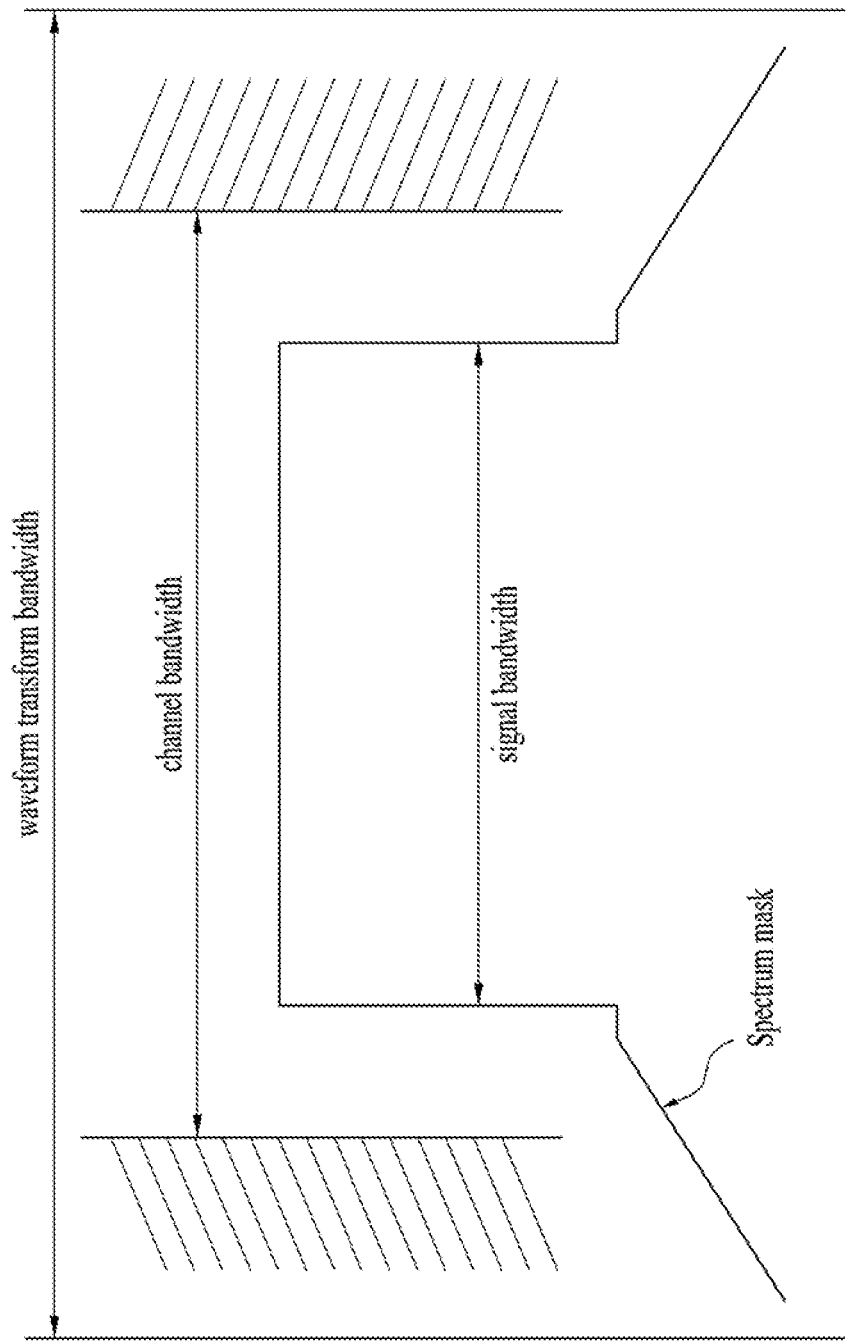
FIG. 17 shows a bandwidth of the broadcast signal according to an embodiment of the present invention.

FIG. 17 shows a bandwidth of the broadcast signal according to an embodiment of the present invention.

Referring to FIG. 17, the bandwidth of the broadcast signal is identical to a waveform transform bandwidth, the waveform transform bandwidth may include a channel bandwidth and a spectrum mask, and the channel bandwidth may include a signal bandwidth.

The transmission (Tx) parameters according to the embodiment need to satisfy the spectrum mask requested for minimizing interference of a contiguous channel within the corresponding channel bandwidth allocated to the next generation broadcast Tx/Rx system, and need to be designed for maximizing the Tx efficiency within the bandwidth of the corresponding broadcast signal. In addition, a plurality of carriers can be used when the above-mentioned waveform generation module 1300 converts input signals, the Tx parameters may coordinate or adjust the spacing among subcarriers according to the number of subcarriers used in the waveform transform bandwidth, the length of an entire symbol in the time domain is decided, and a transmission (Tx) mode appropriate for the Rx scenario of the next generation broadcast Tx/Rx system is classified, such that the Tx parameters can be designed according to the Rx scenario.

FIG. 18. shows tables including Tx parameters according to the embodiment of the present invention.

FIG. 18(A) is a Table that shows guard interval values to be used as Tx parameters according to the above-mentioned reception mode and the network configuration. FIG. 18(B) is a Table that shows vehicle speed values to be used as Tx parameters according to the above-mentioned reception mode and the network configuration.

As described above, the guard interval may be designed in consideration of the maximum delay spread based on the network configuration and the Rx antenna environment according to the reception (Rx) scenario.

The vehicle speed used as the Tx parameter may be designed and decided in consideration of the network configuration and the Rx antenna environment according to Rx scenario categories types.

In order to implement the optimal design of the next generation broadcast Tx/Rx system, the present invention provides a method for establishing the guard interval (or elementary guard interval) and the vehicle speed, and optimizing Tx parameters using the optimization scaling factor.

Symbols (or OFDM symbols) contained in the signal frame according to the embodiment may be transmitted for a specific duration. In addition, each symbol may include not only a guard interval region corresponding to the useful part corresponding to the active symbol duration length, but also the guard interval. In this case, the guard interval region may be located ahead of the useful part.

As shown in FIG. 18(A), the guard interval according to the embodiment may be set to NG_a1,NG_a2, . . . , NG_b1,NG_b2, . . . , NG_c1,NG_c2, . . . , NG_d1, NG_d2, . . . , NG_e1,NG_e2, . . . , NG_f1,NG_f2, . . . , NG_g1,NG_g2, . . . , NG_h1,NG_h2, . . . according to the above-mentioned reception modes.

The guard intervals (a) and (b) shown in FIG. 18(A) may show exemplary guard intervals applicable to the next generation broadcast Tx/Rx system. In more detail, the guard interval (a) shows one embodiment in which the elementary guard interval is set to 25 µs, and the guard interval (b) shows another embodiment in which the elementary guard interval is set to 30 μs. In the above-mentioned embodiments, the optimization scaling factor for implementing optimization based on a network structure while simultaneously optimizing Tx efficiency of Tx signals and SNR damage is set to Lalpha1, Lalpha2, Lbeta1, or Lbeta2.

As shown in FIG. 18(B), the vehicle speed according to the embodiment may be set to quasi static, <Vp_a1 km/h, <Vp_b1 km/h, Vm_a1 km/h~Vm_a2 km/h, or Vm_b1 km/h~Vm_b2 km/h according to the above-mentioned reception modes.

The vehicle speed (a) shown in FIG. 18(B) shows an example of the vehicle speed applicable to the next generation broadcast Tx/Rx system according to the embodiment. In accordance with this embodiment, the elementary vehicle speed may be set to 'quasi-static', '3 km/h', and '3 km/h~200 km/h' according to the respective reception scenarios, and the optimization scaling factor for implementing optimization based on the network structure and optimizing Tx efficiency of Tx signals and time-variant channel estimation may be set to Valpha1, Valpha2, Vbeta1, and Vbeta1.

The following equation may be used to decide an effective signal bandwidth (hereinafter referred to as eBW) of the optimized Tx signals according to the present invention $$eBW = \{N_{waveform\_scaling} \times (N_{pilotdensity} \times N_{eBW}) + \alpha\} \times Fs \text{ (Hz)}$$ [Equation 1].

In Equation 1, $N_{waveform\_scaling}$ may denote a waveform scaling factor, $N_{pilotdensity}$ may denote a pilot density scaling factor, $N_{eBW}$ may denote an effective signal bandwidth scaling factor, and $\alpha$ may denote an additional bandwidth factor. In addition, Fs may denote a sampling frequency.

In order to decide the effective signal bandwidth (eBW) optimized for a spectrum mask based on a channel bandwidth, the present invention may use the above-mentioned factors as the optimization parameters (or optimum parameters). Specifically, according to the equation of the present invention, Tx efficiency of Tx parameters can be maximized by coordinating the waveform transform bandwidth (sampling frequency). The individual factors shown in Equation will hereinafter be described in detail.

The waveform scaling factor is a scaling value depending upon a bandwidth of a carrier to be used for waveform transform. The waveform scaling factor according to the embodiment may be set to an arbitrary value proportional to the length of nonequispaced fast Fourier transform (NFFT) in case of OFDM.

The pilot density scaling factor may be established according to a predetermined position of a reference signal inserted by a reference signal insertion and PAPR reduction block 7100, and may be established by the density of the reference signal.

The effective signal bandwidth scaling factor may be set to an arbitrary value that can satisfy a specification of a spectrum mask contained in the Tx channel bandwidth and at the same time can maximize the bandwidth of the Tx signals. As a result, the optimum eBW can be designed.

The additional bandwidth factor may be set to an arbitrary value for coordinating additional information and structures needed for the Tx signal bandwidth. In addition, the additional bandwidth factor may be used to improve the edge channel estimation throughput of spectrums through reference signal insertion.

Number of Carrier (NoC) may be a total number of carriers transmitted through the signal bandwidth, and may be denoted by the portion of the equation enclosed in brackets.

The broadcast signal transmission apparatus according to the present invention may use Tx parameters that are capable of optimizing the effective signal bandwidth (eBW) according to the number of subcarriers used for transform. In addition, the broadcast signal transmission apparatus according to the present invention can use the above-mentioned effective signal bandwidth scaling factor as a transmission (Tx) parameter capable of optimizing the effective signal bandwidth (eBW).

The effective signal bandwidth (eBW) scaling factor is extended in units of a pilot density of a predetermined reference signal, such that the eBW scaling factor may be set to a maximum value optimized for the spectrum mask. In this case, the broadcast signal transmission apparatus according to the present invention coordinates the waveform transform bandwidth (i.e., sampling frequency) of vague parts capable of being generated according to the pilot density unit, such that the eBW scaling factor for the spectrum mask can be decided.

FIG. 19 shows a table including Tx parameters capable of optimizing the effective signal bandwidth (eBW) according to the embodiment.

The Tx parameters shown in FIG. 19 can satisfy the Federal Communications Commission (FCC) spectrum mask for the 6 MHz channel bandwidth, and can optimize the effective signal bandwidth (eBW) of the next generation broadcast system based on the OFDM scheme.

FIG. 19(A) shows Tx parameters (See Example A) established with respect to the guard interval (a) and the vehicle speed (a). FIG. 19(B) shows Tx parameters (See Example B) established with respect to the guard interval (b) and the vehicle speed (b).

FIG. 19(A') shows a table indicating an embodiment of a GI duration for combination of FFT and GI modes established by the concept of FIG. 19(A). FIG. 19(B') shows a table indicating an embodiment of a GI duration for combination of FFT (NFFT) and GI modes established by the concept of FIG. 19(B).

Although the Tx parameters shown in FIGS. 19(A) and 19(B) are established for three FFT modes (i.e., 8K, 16K and 32K FFT modes), it should be noted that the above Tx parameters can also be applied to other FFT modes (i.e., 1K/2K/4K/64K FFT modes) as necessary. In addition, FIG. 19(A) and FIG. 19(B) show various embodiments of the optimization scaling factors applicable to the respective FFT modes.

The broadcast signal transmission apparatus according to the embodiment can insert the reference signal into the time and frequency domains in consideration of the Tx parameters shown in (A) and (B), the reception scenario, and the network configuration, and the reference signal can be used as additional information for synchronization and channel estimation.

The broadcast signal transmission apparatus according to the embodiment may establish the density (Npilotdensity) of a reference signal and the optimized eBW in consideration of the ratio of a channel estimation range of the guard interval. In addition, the waveform scaling factor according to the embodiment may be determined in proportion to the FFT size for each FFT mode.

If a total number of the remaining carriers other than a null carrier used as a guard band during IFFT is decided by the waveform transform scheme, the broadcast signal transmission apparatus according to the embodiment may coordinate the waveform transform bandwidth (i.e., sampling frequency) so as to determine a maximum signal bandwidth not exceeding the spectrum mask. The sampling frequency may decide the optimized signal bandwidth, and may be sued to decide the OFDM symbol duration and the subcarrier spacing. Accordingly, the sampling frequency may be determined in consideration of not only the guard interval, a Tx channel of the vehicle speed, and the reception scenario, but also the Tx signal efficiency and the SNR damage. In FIG. 19, (A) shows an embodiment in which 'Fs' is set to 221/32 MHz, and (B) shows an embodiment in which 'Fs' is set to (1753/256) MHz.

'fc' in FIGS. 19(A) and 19(B) may denote the center frequency of the RF signal, and 'Tu' may denote an active symbol duration.

FIG. 20 shows a table including Tx parameters for optimizing the effective signal bandwidth (eBW) according to another embodiment of the present invention.

FIG. 20(A) shows a table indicating the same Tx parameters (See Example A) as in FIG. 19(A).

FIG. 20(B) shows another embodiment of the Table of FIG. 19(B). Table of FIG. 20(B) shows Tx parameters (See Example B-1) established with respect to the guard interval (b) and the vehicle speed (b).

FIG. 20(A') shows a table indicating an embodiment of a GI duration for combination of FFT and GI modes established by the concept of FIG. 20(A). FIG. 20(B') shows a table indicating an embodiment of a GI duration for combination of FFT and GI modes established by the concept of FIG. 20(B).

Although the Tu value of the center column of FIG. 20(B) is changed to 2392.6 differently from the concept of FIG. 19(B), the remaining functions and values of the respective Tx parameters shown in FIG. 20 are identical to those of FIG. 19, and as such a detailed description thereof will herein be omitted for convenience of description.

FIG. 21 shows a Table including Tx parameters for optimizing the effective signal bandwidth (eBW) according to another embodiment of the present invention.

FIG. 21(A) shows a Table indicating another embodiment of the concept of FIG. 20(B). In more detail, FIG. 21(A) is a Table including Tx parameters (See Example B-2) in case that 'Fs' is set to 219/32 MHz.

FIG. 21(B) shows a Table indicating an embodiment of a GI duration for combination of FFT and GI modes established by the concept of FIG. 21(A).

Tx parameters shown in FIG. 21(A) have a lower eBW value but higher values of fc and Tu, differently from the Tx parameters shown in FIG. 20(B). In this case, according to one embodiment of the present invention, the eBW value may be set to a specific value that is capable of being established as a factor with respect to the channel bandwidth.

FIG. 22 shows Tx parameters according to another embodiment of the present invention.

As can be seen from FIG. 22(A), when establishing the scaling factor and the Fs value corresponding to a channel bandwidth of 5, 7, or 8 MHz, the resultant scaling factor can be obtained by the product (multiplication) of a scaling factor having been calculated on the basis of the 6 MHz Fs value. The scaling factor may correspond to the rate of the channel bandwidth.

FIG. 22(B) is a Table including Tx parameters capable of optimizing the effective signal bandwidth (eBW) shown in FIGS. 19 to 21.

In more detail, a Table located at an upper part of FIG. 22(B) shows Tx parameters corresponding to the 5, 6, 7, 8 MHz channel bandwidths of FIGS. 19(A) and 20(B).

The table located at the center part of FIG. 22(B) shows Tx parameters corresponding to the 5, 6, 7, 8 MHz channel bandwidths of the example (B-1) of FIG. 20.

The table located at the lower part of FIG. 22(B) shows Tx parameters corresponding to the channel bandwidth shown in the example (B-2) of FIG. 21.

Referring to the second row of FIG. 22(A), the Fs value corresponding to each channel bandwidth in the upper end of FIG. 22(B) is calculated by the product of the scaling factor having been calculated on the basis of the 6 MHz Fs value.

Referring to the third row of FIG. 22(A), the Fs value corresponding to each channel bandwidth in the center part of FIG. 22(B) is calculated by the product of the scaling factor having been calculated on the basis of the 6 MHz Fs value. Referring to the third row of FIG. 22(A), the Fs value corresponding to each channel bandwidth in the lower part of FIG. 22(B) is calculated by the product of the scaling factor having been calculated on the basis of the 6 MHz Fs value.

Figure 23:
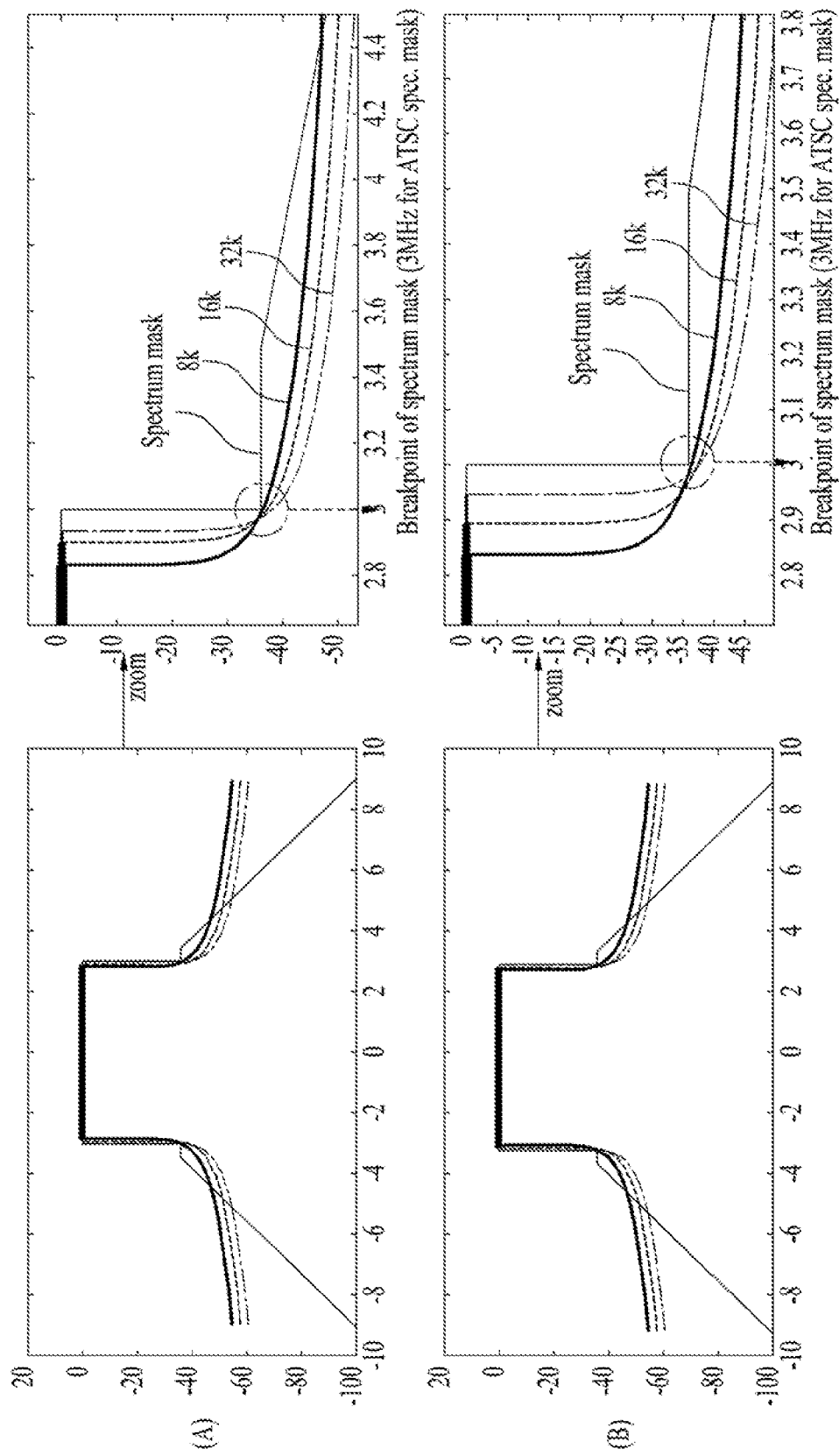
FIG. 23 is a graph indicating Power Spectral Density (PSD) of a transmission (Tx) signal according to an embodiment of the present invention.

FIG. 23 is a graph indicating Power Spectral Density (PSD) of a transmission (Tx) signal according to an embodiment of the present invention.

FIG. 23 shows the Power Spectral Density (PSD) calculated using the above-mentioned Tx parameters when the channel bandwidth is set to 6 MHz.

The left graph of FIG. 23(A) shows the PSD of the Tx signal optimized for the FCC spectrum mask of the example (A) of FIGS. 19 and 20. The right graph of FIG. 23(A) shows the enlarged result of some parts of the left graph.

The left graph of FIG. 23(B) shows the PSD of the Tx signal optimized for the FCC spectrum mask of the example (B) of FIG. 19. The right graph of FIG. 23(B) shows the enlarged result of some parts of the left graph.

As shown in the right graph of (A) and (B), individual graphs show not only lines for designating the FCC spectrum mask specification, but also lines indicating PSD of the Tx signal derived using Tx parameters corresponding to 8K, 16K and 32K.

In order to optimize the Tx signal efficiency as shown in FIG. 23, the PSD of each Tx signal need not exceed a threshold value of the spectrum mask at a breakpoint of the target spectrum mask. In addition, a band of the PSD of an out-of-band emission Tx signal may be limited by a baseband filter as necessary.

FIG. 24 is a table showing information related to the reception mode according to another embodiment of the present invention.

FIG. 24 shows another embodiment of the Table showing information related to the reception mode of FIG. 16. Table of FIG. 24 shows a network configuration, an FFT value (NFFT), a guard interval, and a vehicle speed, that correspond to each reception mode. The guard interval and the vehicle speed of FIG. 24 are identical to those of FIG. 18.

Since the fixed rooftop environment corresponds to a time-variant Tx channel environment, it is less affected by Doppler shift, such that a large-sized FFT such as 16K, 32K, etc. can be used. In addition, data transmission can be carried out in a manner that a higher data Tx efficiency can be achieved in the redundancy ratio such as the guard interval, the reference signal, etc. appropriate for the network configuration.

In case of the handheld portable environment, a low-level Doppler environment can be supported as the indoor/outdoor reception environments in consideration of mobility such as an adult walking speed, and FFT such as 8K, 16K, 32K, etc. capable of supporting a high frequency sensitivity can be used.

The handheld mobile environment must consider not only the walking speed of a receiving user, but also the moving speed of a vehicle, a train, etc. such that the handheld mobile environment can support the high Doppler environment, and can use 4K-, 8K-, and 16K-FFT capable of supporting a relatively low frequency sensitivity.

The guard interval according to an embodiment of the present invention may be established to support the same coverage level in consideration of the network configuration for each reception.

The following description proposes the pilot pattern used as a reference signal for Tx channel estimation and the pilot mode for the same Tx channel estimation on the basis of the above embodiments of the above-mentioned Tx parameters.

The broadcast signal transmission apparatus or the above-mentioned waveform transform block 7200 according to the embodiment can insert a plurality of pilots into a signal frame generated from the frame structure module 1200, and can OFDM-modulate the broadcast signals using the Tx parameters. Various cells contained in the OFDM symbol may be modulated using reference information (i.e., pilots). In this case, the pilots may be used to transmit information known to the broadcast signal receiver, and the individual pilots may be transmitted at a power level specified by a pilot pattern.

The pilots according to the embodiment of the present invention may be used for frame synchronization, frequency and time synchronization, channel estimation, etc.

The pilot mode according to the embodiment of the present invention may be specific information for indicating pilots which reduce overhead of Tx parameters and are established to transmit the optimized broadcast signal. The above-mentioned pilot pattern and pilot mode may equally be applied to the above-mentioned reception mode and network configuration. In addition, the pilot pattern and pilot mode according to the embodiment can be applied to data symbols contained in the signal frame.

Figure 25:
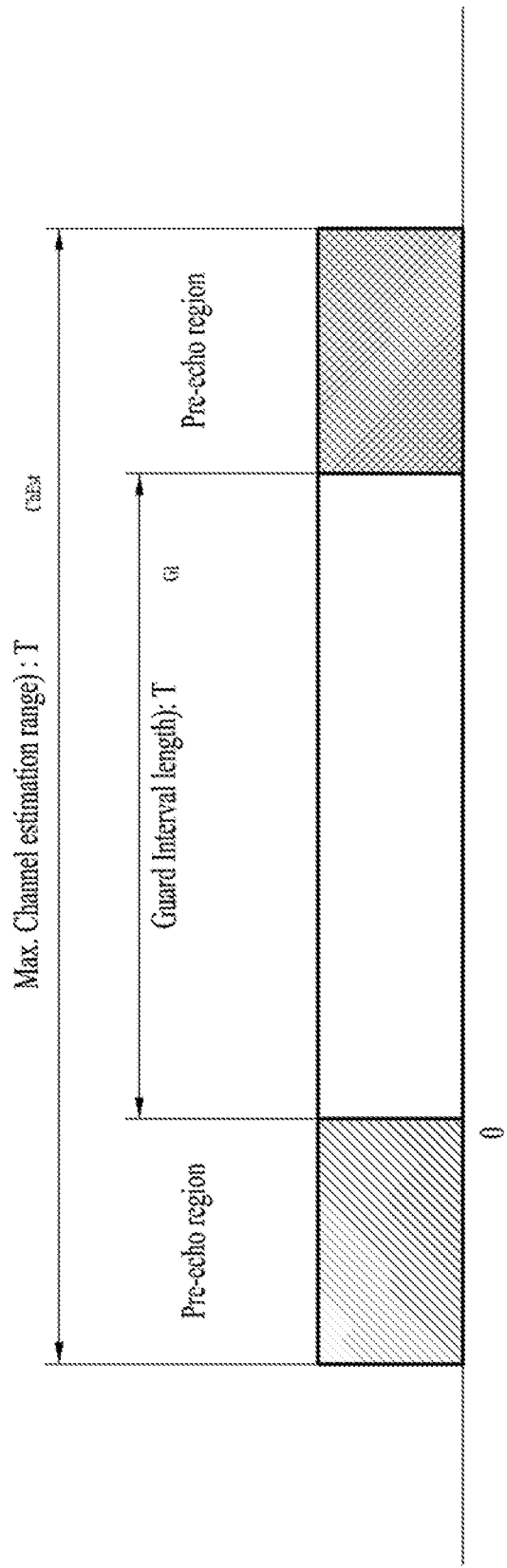
FIG. 25 shows the relationship between a maximum channel estimation range and a guard interval according to the embodiment.

FIG. 25 shows the relationship between a maximum channel estimation range and a guard interval according to the embodiment.

As described above, Equation 1 is used to decide the effective signal bandwidth (eBW) of the Tx signal, and may use the pilot density scaling factor as an optimization parameter.

In this case, Equation 1 may be decided by optimizing time- and frequency-arrangement of the pilot signal for SISO channel estimation, a pilot density related to data efficiency, and Dx and Dy values.

The pilot density may correspond to the product of a distance between pilots of the time and frequency domains, and pilot overhead occupied by pilots of the symbol may correspond to the inverse of the pilot density.

Dx may denote a distance between pilots in a frequency domain, and Dy may denote a distance between pilots in a time domain. Dy may be used to decide the maximum tolerable Doppler speed. Accordingly, Dy may be set to a specific value that is optimized in consideration of the vehicle speed decided according to Rx scenario categories.

As described above, the pilot density may be used to decide the pilot overhead, and the Dx and Dy values may be decided in consideration of the Tx channel state and the Tx efficiency.

The maximum channel estimation range (TChEst) shown in FIG. 25 may be decided by dividing the Tx parameter (Tu) by the Dx value.

The guard interval having a predetermined length, the pre-echo region, and the post-echo region may be contained in the maximum channel estimation range.

The ratio of a given guard interval and a maximum channel estimation range may indicate a margin having a channel estimation range for estimating the guard interval. If the margin value of the channel estimation range exceeds the guard interval length, values exceeding the guard interval length may be assigned to the pre-echo region and the post-echo region. The pre-echo region and the post-echo region may be used to estimate the channel impulse response exceeding the guard interval length, and may be used as a region to be used for estimation and compensation of a timing error generable in a synchronization process. However, if the margin is increased in size, the pilot overhead is unavoidably increased so that Tx efficiency can be reduced.

FIGS. 26 and 27 show Tables in which pilot parameters depending on the guard intervals (A) and (B) and the vehicle speed are defined, and the tables shown in FIGS. 26 and 27 will hereinafter be described in detail.

FIG. 26 shows a Table in which pilot parameters are defined according to an embodiment of the present invention.

FIG. 26 shows the pilot parameters according to the guard interval (A) and the vehicle speed. FIG. 26(A) is a table indicating pilot patterns for use in the SISO and MIXO Tx channels, FIG. 26(B) shows the configuration of a pilot pattern for use in the SISO and MIXO Tx channels, and FIG. 26(C) is a table indicating the configuration of a pilot pattern for use in the MIXO Tx channel.

In more detail, FIG. 26(A) shows the pilot pattern decided for each pilot density value and the Dx and Dy values defined in each of the SISO and MIXO Tx channels. The pilot pattern according to this embodiment may be denoted by PP5-4 in which a first number denotes the Dx value and a second number denotes the Dy value. If the Dx value in the same pilot density is reduced, the pilot pattern can support a longer delay spread. If the Dy value is reduced, the pilot pattern can adaptively cope with a faster Doppler environment.

FIG. 26(B) and FIG. 26(C) show Tables including the guard interval duration and the pilot pattern configuration depending on the FFT value. In more detail, numbers shown in the first row of each table shown in (B) and (C) may denote the guard interval duration. The first column may denote FFT (NFFT) values described in FIGS. 19 to 22. However, although FIGS. 26(B) and 26(C) equally show the configuration of the pilot pattern for use in the MIXO case, there is a difference in FIGS. 26(B) and 26(C) in that FIG. 26(B) shows the MIXO-1 pilot pattern having a larger pilot overhead, and FIG. 26(C) shows the MIXO-2 pilot pattern having a lower mobility.

The duration of the guard interval shown in FIGS. 26(B) and 26(C) is conceptually identical to the guard interval length shown in FIG. 25. In accordance with the embodiment of the present invention, 25 μs, 50 μs, 100 μs, 200 μs, and 400 μs values may be used in consideration of the maximum delay spread, and the FFT size may be set to 8K, 16K and 32K.

As can be seen from (A), the Dx value may be set to 5, 10, 20, 40, 80, or 160 in consideration of the guard interval duration and the FFT size. In this case, an elementary Dx value (5) acting as a basic value may be defined as a changeable value depending on each Tx mode, and may be established in consideration of about 20% of the margin value of the above-mentioned channel estimation range. In addition, according to one embodiment of the present invention, the margin value of the channel estimation range may be coordinated or adjusted using the Lalpha1 value in MFN and using the Lalpha2 value in SFN as shown in FIGS. 18(A) and 18(B).

The Dy value may be established according to a reception (Rx) scenario and the Tx mode dependent upon the Rx scenario. Accordingly, the Dy value may be assigned different values according to the SISO or MIXO Tx channel. As shown in the drawing, Dy may be set to 2, 4 or 8 in case of the SISO Tx channel according to an embodiment of the present invention.

The MIXO Tx channel is classified into the MIXO-1 version having large pilot overhead and the MIXO-2 version having lower mobility, such that the Dy value can be established in different ways according to individual versions.

The MIXO-1 version having large overhead increases the pilot overhead, so that I can support the same maximum delay spread and the same maximum mobile speed in the same network configuration as in the SISO Tx channel. In this case, the Dy value may be set to 2, 4 or 8 in the same manner as in the SISO Tx channel. That is, the MIXO-1 Tx channel can be applied not only to the above-mentioned handheld portable environment but also the handheld mobile environment.

The MIXO-2 version having low mobility is designed to guarantee the same coverage and capacity as in the SISO Tx channel although the MIXO-2 version has a little damage in terms of the mobile speed support. In this case, the Dy value may be set to 4, 8, or 16.

FIG. 27 shows a Table in which pilot parameters of another embodiment are defined according to an embodiment of the present invention.

In more detail, FIG. 27 shows the pilot parameters according to the guard interval (B) and the vehicle speed. FIG. 27(A) is a table indicating pilot patterns for use in the SISO and MIXO Tx channels, FIG. 27(B) shows the configuration of a pilot pattern for use in the SISO and MIXO Tx channels, and FIG. 27(C) is a table indicating the configuration of a pilot pattern for use in the MIXO Tx channel.

Functions and contents of the pilot parameters shown in FIG. 27 are identical to those of FIG. 26, and as such a detailed description thereof will herein be omitted for convenience of description.

The structure and location of pilots for MIXO (MISO, MIMO) Tx channel estimation may be established through the above-mentioned pilot patterns. The null encoding and the Hadamard encoding scheme may be used as the pilot encoding scheme for isolating each Tx channel according to one embodiment of the present invention.

The following equation 2 may be used to indicate the null encoding scheme.

$$\begin{bmatrix} y_{tx1} \\ y_{tx2} \end{bmatrix} = \begin{bmatrix} 1 & 0 \\ 0 & 1 \end{bmatrix} \begin{bmatrix} p_{tx1} \\ p_{tx2} \end{bmatrix}$$

$$\begin{bmatrix} y_{tx1} \\ y_{tx2} \end{bmatrix} = \begin{bmatrix} 1 & 0 \\ 0 & 1 \end{bmatrix} \begin{bmatrix} p_{tx1} \\ p_{tx2} \end{bmatrix}$$

[Equation 2]

The null encoding scheme has no channel interference in estimating respective channels, the channel estimation error can be minimized, and an independent channel can be easily estimated in the case of using symbol timing synchronization. However, since the pilot gain must be amplified to derive a channel estimation gain, the influence of Inter Channel Interference (ICI) of contiguous data caused by the pilot based on a time-variant channel is relatively high. In addition, if the pilots to be allocated to individual channels according to the pilot arrangement have different locations, the SNR of effective data may be changed per symbol. The MIXO-1 pilot pattern according to the above-mentioned embodiment may also be effectively used even in the null encoding scheme, and a detailed description thereof will hereinafter be given.

The following equation may be used to indicate the null encoding scheme.

$$\begin{bmatrix} y_{tx1} \\ y_{tx2} \end{bmatrix} = \begin{bmatrix} 1 & 1 \\ 1 & -1 \end{bmatrix} \begin{bmatrix} p_{tx1} \\ p_{tx2} \end{bmatrix}$$

[Equation 3]

In case of the Hadamard encoding scheme, the Hadamard encoding scheme can perform channel estimation through simple linear calculation, and can obtain a gain caused by the noise average effect as compared to the null encoding scheme. However, the channel estimation error encountered in the process for obtaining an independent channel may unexpectedly affect other channels, and there may occur ambiguity in the symbol timing synchronization using pilots.

The broadcast signal transmission apparatus according to the embodiment of the present invention may establish the above-mentioned two encoding schemes described as the MIXO pilot encoding scheme according to the reception (Rx) scenario and the Tx channel condition in response to a predetermined mode. The broadcast signal reception apparatus according to the embodiment may perform channel estimation through a predetermined mode.

Figure 28:
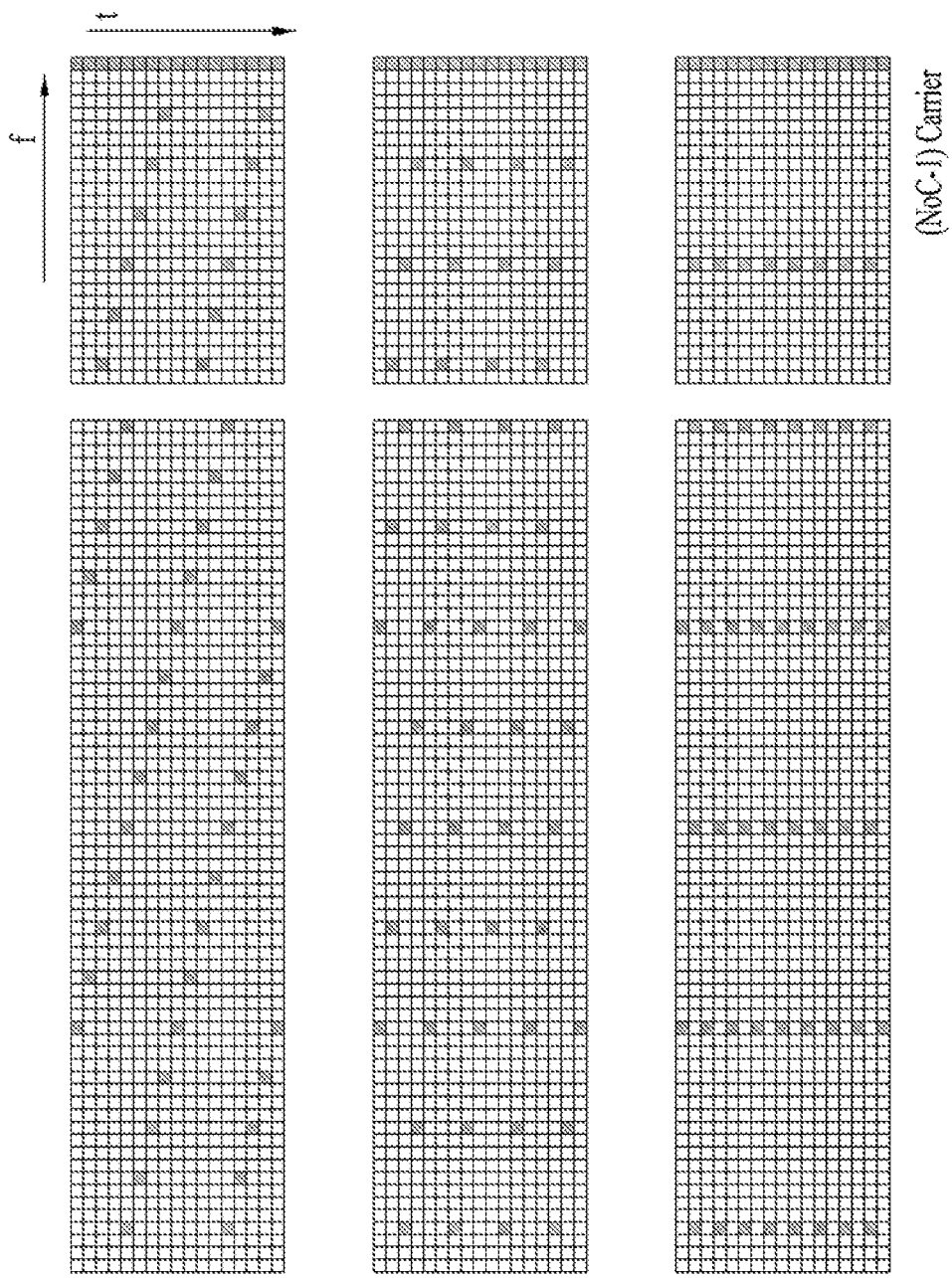
FIG. 28 shows the SISO pilot pattern according to an embodiment of the present invention.

FIG. 28 shows the SISO pilot pattern according to an embodiment of the present invention.

The pilot pattern shown in FIG. 28 indicates the SISO pilot pattern for use in the case in which the pilot density of FIG. 27 is set to 32.

As described above, the pilots may be inserted into a data symbol region of the signal frame. In FIG. 28, a horizontal axis of the pilot pattern may denote a frequency axis, and a vertical axis thereof may denote a time axis. In addition, pilots successively arranged at both ends of the pilot pattern may indicate reference signals that are inserted to compensate for distortion at the edge of a spectrum generated by channel estimation.

In more detail, FIG. 28(A) shows an exemplary pilot pattern denoted by PP4-8, FIG. 28(B) shows an exemplary pilot pattern denoted by PP8-4, and FIG. 28(C) shows an exemplary pilot pattern denoted by PP16-2. In other words, as can be seen from FIG. 28(A), pilots may be periodically input in units of 4 carriers on the frequency axis, and each pilot may be input in units of 8 symbols on the time axis. FIG. 28(B) and FIG. 28(C) also illustrate pilot patterns having been input in the same manner.

The pilot pattern of another pilot density shown in FIG. 27 may be denoted by coordination of the Dx and Dy values.

Figure 29:
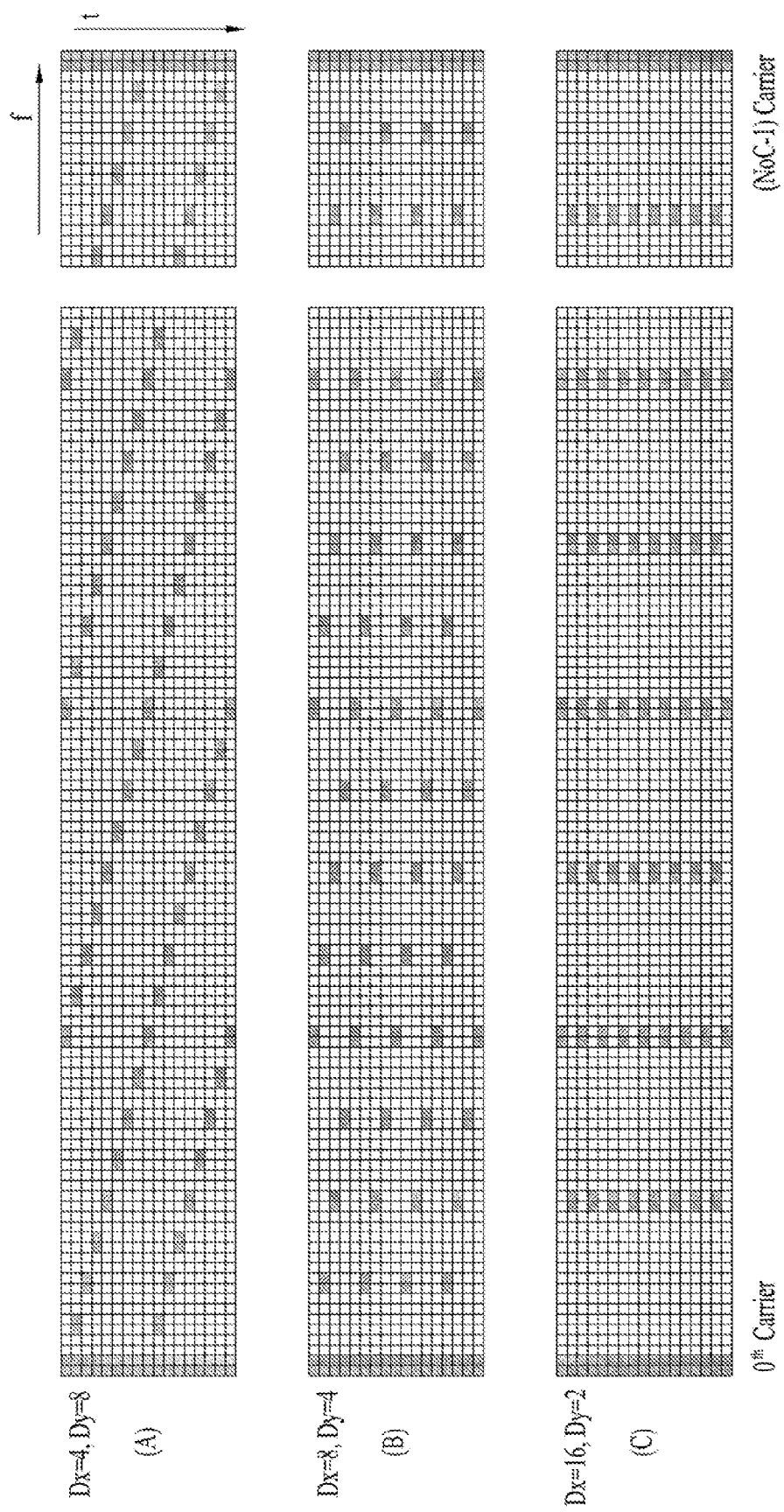
FIG. 29 shows the MIXO-1 pilot pattern according to an embodiment of the present invention.

FIG. 29 shows the MIXO-1 pilot pattern according to an embodiment of the present invention.

The pilot pattern of FIG. 29 shows the MIXO-1 pilot pattern for use in the case that the pilot density of FIG. 27 is set to 32. The pilot pattern of FIG. 29 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-8, (B) may denote an exemplary case in which the pilot pattern is denoted by PP8-4, and (C) may denote an exemplary case in which the pilot pattern is denoted by PP16-2.

In order to discriminate among the individual MIXO Tx channels, pilots transmitted to the respective Tx channels may be arranged contiguous to each other in the frequency domain according to an embodiment of the present invention. In this case, the number of pilots allocated to two Tx channels within one OFDM symbol is set to the same number.

As shown in the drawing, the MIXO-1 pilot pattern according to an embodiment has an advantage in that a data signal is arranged at the next position of a channel estimation pilot even when a reference signal for synchronization estimation is arranged, so that correlation between signals is reduced at the same carrier and the synchronization estimation throughput is not affected by the reduced correlation.

In case of the MIXO-1 pilot pattern according to an embodiment, even when the broadcast signal transmission apparatus performs pilot encoding using the above-mentioned null encoding scheme, broadcast signals having the same Tx power can be transmitted to the individual Tx antennas, such that the broadcast signals can be transmitted without additional devices or modules for compensating for variation of Tx signals. That is, in case of using the MIXO-1 pilot pattern according to an embodiment, the MIXO-1 pilot pattern is not affected by the pilot encoding scheme, and pilot power is coordinated by the pilot encoding scheme, such that the channel estimation throughput of the broadcast signal reception apparatus can be maximized.

The pilot pattern of another pilot density shown in FIG. 27 may be denoted by coordination of the Dx and Dy values.

Figure 30:
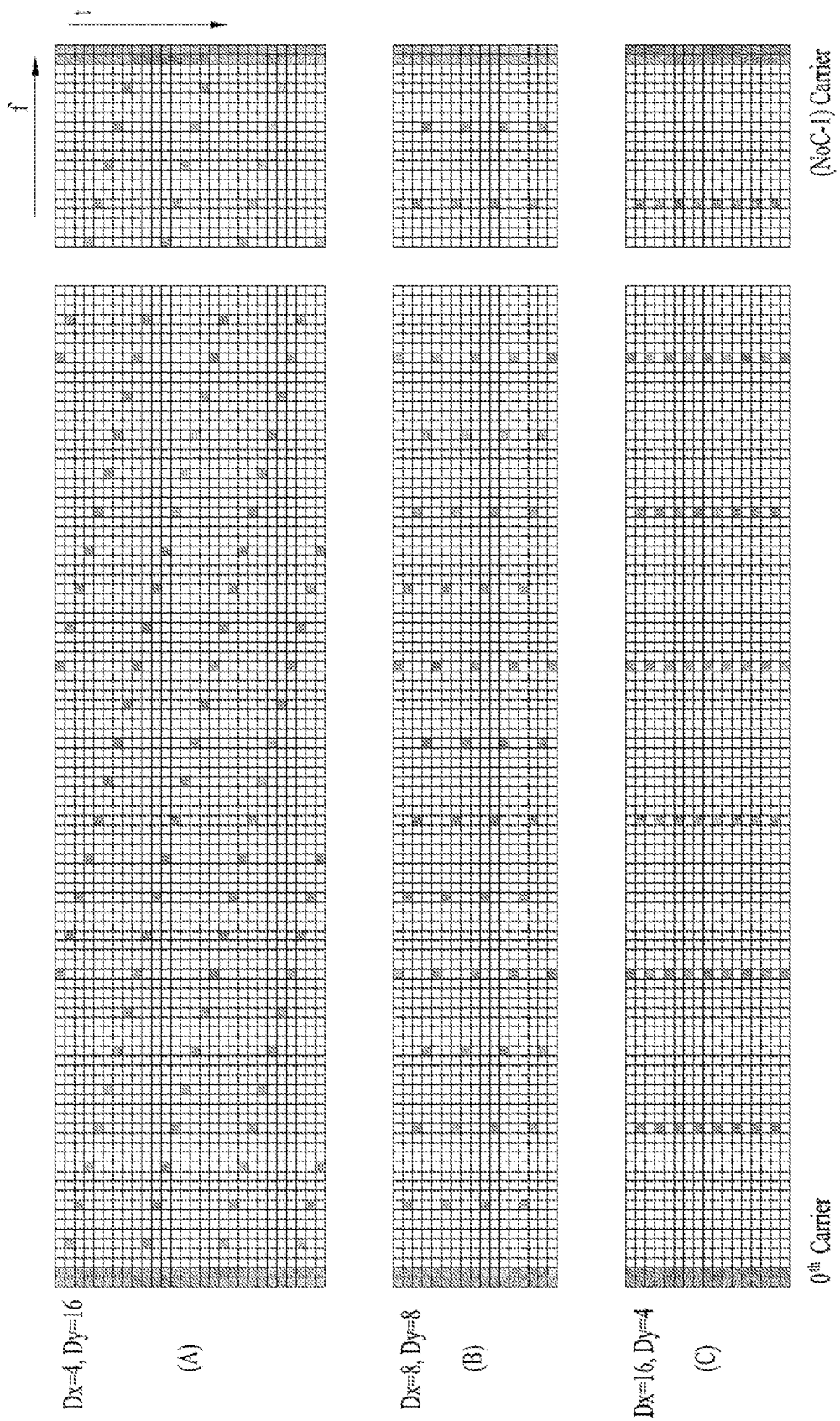
FIG. 30 shows the MIXO-2 pilot pattern according to an embodiment of the present invention.

FIG. 30 shows the MIXO-2 pilot pattern according to an embodiment of the present invention.

The pilot pattern of FIG. 30 shows the MIXO-2 pilot pattern for use in the case that the pilot density of FIG. 27 is set to 32. The pilot pattern of FIG. 30 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-16, (B) may denote an exemplary case in which the pilot pattern is denoted by PP8-8, and (C) may denote an exemplary case in which the pilot pattern is denoted by PP16-4.

As described above, the MIXO-2 pilot pattern is designed to cut the supported mobility in half, instead of supporting the same capacity, the same pilot overhead, and the same coverage as those of the SISO Tx channel.

Tx channels are semi-statically used in the reception scenario in which the UHDTV service must be supported so that the serious problem does not occur. The MIXO-2 pilot pattern according to an embodiment can be used to maximize the data Tx efficiency in the reception scenario in which the UHDTV service must be supported.

The pilot pattern of another pilot density shown in FIG. 27 may be denoted by coordination of the Dx and Dy values.

FIG. 31 is a flowchart illustrating a method for transmitting a broadcast signal according to an embodiment of the present invention.

Referring to FIG. 31, an apparatus for transmitting a broadcast signal may encode DP data corresponding to DP configured to transmit at least one broadcast service or at least one service component in step S31000. At least one broadcast service may correspond to any one of a broadcast service for a fixed receiver and a broadcast service for a mobile receiver, and individual broadcast services are distinguished from one another on a frame basis and then transmitted. A detailed encoding method is as follows.

Thereafter, the apparatus for transmitting a broadcast signal according to an embodiment of the present invention may map the encoded DP data to constellation in step S31100. After that, the apparatus for transmitting the broadcast signal according to an embodiment of the present invention may perform time-interleaving of the mapped DP data in step S31200. As described above, the DP data may be processed for each DP path, and a detailed interleaving method is as follows.

Thereafter, the apparatus for transmitting a broadcast signal according to an embodiment of the present invention may generate at least one signal frame including the time-interleaved DP data in step S31300. As described above, DP data processed through each path may be mapped to a data symbol region of the signal frame. After that, the apparatus for transmitting the broadcast signal according to an embodiment of the present invention may insert at least one pilot in at least one signal frame according to at least one pilot pattern in step S31400. As can be seen from FIGS. 24 to 30, at least one pilot pattern may be established in different ways according to the broadcast service for the fixed receiver and the broadcast service for the mobile receiver, and may be determined according to the FFT size and the guard interval size. A detailed description thereof has been given above.

Thereafter, the apparatus for transmitting a broadcast signal according to an embodiment of the present invention may OFDM-process at least one signal frame using OFDM parameters in step S31500. As can be seen from FIGS. 16 to 23, the OFDM parameters may be determined according to the FFT size. A detailed description thereof has been given above.

After that, the apparatus for transmitting a broadcast signal according to an embodiment may transmit at least one broadcast signal including at least one signal frame in step S31600.

FIG. 32 is a flowchart illustrating a method for receiving a broadcast signal according to an embodiment of the present invention.

The concept of FIG. 32 may correspond to a reverse process of the broadcast signal transmission method shown in FIG. 31.

Referring to FIG. 32, an apparatus for receiving a broadcast signal according to an embodiment may receive at least one broadcast signal, and may OFDM-process the at least one broadcast signal using OFDM parameters in step S32000. As can be seen from FIGS. 16 to 23, the OFDM parameters may be determined according to the FFT size. A detailed description thereof has been given above.

Thereafter, the apparatus for receiving the broadcast signal according to the embodiment may detect at least one pilot contained in at least one demodulated broadcast signal in step S32100. As can be seen from FIGS. 24 to 30, at least one pilot may be inserted according to at least one pilot pattern, and may be established in different ways according to a broadcast service for the fixed service or a broadcast service for the mobile service and may be determined according to the FFT size and the guard interval size. A detailed description thereof has been given above.

After that, the apparatus for receiving a broadcast signal according to an embodiment of the present invention may acquire at least one signal frame from at least one broadcast signal in step S32200. As described above, the DP data may be mapped to a data symbol region.

Thereafter, the apparatus for receiving the broadcast signal according to an embodiment may perform time-deinterleaving of DP data contained in at least one signal frame in step S32300.

After that, the apparatus for receiving a broadcast signal according to an embodiment may perform demapping of the deinterleaved DP data in step S32400, and may decode the demapped DP data and thus acquire a desired service or a service component in step S32500. As described above, each DP data may be processed through the corresponding DP path, and a detailed process thereof has been given above.

MODES FOR INVENTION

Details about modes for the present invention have been described in the above best mode.

INDUSTRIAL APPLICABILITY

As described above, the present invention can be wholly or partially applied to the apparatus for transmitting/receiving a digital broadcast signal and digital broadcast systems.

The invention claimed is:

1. A method for transmitting a broadcast signal, the method comprising:
encoding Data Pipe (DP) data corresponding to a Data Pipe (DP) carrying at least one broadcast service or at least one service component;
mapping the encoded DP data to constellations;
Multiple Input Multiple Output (MIMO) encoding the mapped DP data;
time-interleaving the MIMO encoded DP data;
generating at least one signal frame including the time-interleaved DP data;
inserting MIMO pilots into the generated at least one signal frame according to at least one pilot pattern, wherein the MIMO pilots are encoded according to one of two MIMO pilot encoding algorithms, a Hadamard encoding algorithm and a Null encoding algorithm;
orthogonal frequency division multiplexing (OFDM) modulating the generated at least one signal frame; and
transmitting at least one broadcast signal including the modulated at least one signal frame.

2. The method according to claim 1, wherein the MIMO pilot encoding algorithms divide the MIMO pilots into two groups.

3. The method according to claim 1, wherein the MIMO pilots are inserted according to a MIMO pilot pattern in which a minimum distance between the MIMO pilots in a frequency domain is 8 subcarriers and a minimum distance between the MIMO pilots in a time domain is 4 symbols.

4. The method according to claim 3, wherein the MIMO pilots in the MIMO pilot pattern are transmitted by two transmit antennas.

5. The method according to claim 4, wherein the MIMO pilot pattern in which the minimum pilot distance is 8 subcarriers in the frequency domain and 4 symbols in the time domain has same pilot positions as a Single Input Single Output (SISO) pilot pattern in which a minimum pilot distance is 8 subcarriers in the frequency domain and 4 symbols in the time domain.

6. The method according to claim 1, wherein the MIMO pilots are inserted according to a MIMO pilot pattern in which a minimum distance between the MIMO pilots in a frequency domain is 16 subcarriers and a minimum distance between the MIMO pilots in a time domain is 2 symbols.

7. An apparatus for transmitting a broadcast signal, the apparatus comprising:
an encoder to encode Data Pipe (DP) data corresponding to a Data Pipe (DP) carrying at least one broadcast service or at least one service component;
a mapper to map the encoded DP data to constellations;
a Multiple Input Multiple Output (MIMO) encoder to encode the mapped DP data;
a time-interleaver to time-interleave the MIMO encoded DP data;
a frame builder to generate at least one signal frame including the time-interleaved DP data;
a pilot insertion unit to insert MIMO pilots into the generated at least one signal frame according to at least one pilot pattern, wherein the MIMO pilots are encoded according to one of two MIMO pilot encoding algorithms, a Hadamard encoding algorithm and a Null encoding algorithm;
an orthogonal frequency division multiplexing (OFDM) modulator to OFDM-modulate the generated at least one signal frame; and
a transmitter to transmit at least one broadcast signal including the modulated at least one signal frame.

8. The apparatus according to claim 7, wherein the MIMO pilot encoding algorithms divide the MIMO pilots into two groups.

9. The apparatus according to claim 7, wherein the MIMO pilots are inserted according to a MIMO pilot pattern in which a minimum distance between the MIMO pilots in a frequency domain is 8 subcarriers and a minimum distance between the MIMO pilots in a time domain is 4 symbols.

10. The apparatus according to claim 9, wherein the MIMO pilots in the MIMO pilot pattern are transmitted by two transmit antennas.

11. The apparatus according to claim 10, wherein the MIMO pilot pattern in which the minimum pilot distance is 8 subcarriers in the frequency domain and 4 symbols in the time domain has same pilot positions as a Single Input Single Output (SISO) pilot pattern in which a minimum pilot distance is 8 subcarriers in the frequency domain and 4 symbols in the time domain.

12. The apparatus according to claim 7, wherein the MIMO pilots are inserted according to a MIMO pilot pattern in which a minimum distance between the MIMO pilots in a frequency domain is 16 subcarriers and a minimum distance between the MIMO pilots in a time domain is 2 symbols.

* * * * *